(12) United States Patent
Choi

(10) Patent No.: US 11,953,068 B2
(45) Date of Patent: Apr. 9, 2024

(54) PARKING BRAKE APPARATUS FOR VEHICLE

(71) Applicant: HYUNDAI MOBIS Co., Ltd., Seoul (KR)

(72) Inventor: Moo Jin Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 746 days.

(21) Appl. No.: 17/139,206

(22) Filed: Dec. 31, 2020

(65) Prior Publication Data

US 2022/0065315 A1 Mar. 3, 2022

(30) Foreign Application Priority Data

Aug. 25, 2020 (KR) ........................ 10-2020-0107107

(51) Int. Cl.

| | |
|---|---|
| *B60T 13/74* | (2006.01) |
| *B60T 1/06* | (2006.01) |
| *F16D 55/226* | (2006.01) |
| *F16D 65/18* | (2006.01) |
| *F16H 37/06* | (2006.01) |
| *F16D 121/24* | (2012.01) |
| *F16D 125/40* | (2012.01) |
| *F16D 125/48* | (2012.01) |
| *F16D 125/50* | (2012.01) |

(52) U.S. Cl.
CPC ............ *F16D 65/183* (2013.01); *B60T 1/065* (2013.01); *F16D 55/226* (2013.01); *F16H 37/065* (2013.01); *F16D 2121/24* (2013.01); *F16D 2125/40* (2013.01); *F16D 2125/48* (2013.01); *F16D 2125/50* (2013.01); *F16H 2702/02* (2013.01)

(58) Field of Classification Search
CPC .. F16D 65/183; F16D 55/226; F16D 2125/40; F16D 2125/50; F16D 2121/24; F16D 2125/48; F16H 37/065; F16H 2702/02; B60T 1/065; B60T 13/741
See application file for complete search history.

(56) References Cited

U.S. PATENT DOCUMENTS

| 6,878,089 B2 | 4/2005 | Severinsson |
|---|---|---|
| 8,205,725 B2 | 6/2012 | Sakashita |

(Continued)

FOREIGN PATENT DOCUMENTS

| DE | 10296905 T5 | 5/2004 |
|---|---|---|
| DE | 102009023432 A1 | 12/2009 |

(Continued)

*Primary Examiner* — Nicholas J Lane
(74) *Attorney, Agent, or Firm* — H.C. Park & Associates, PLC

(57) ABSTRACT

A parking brake apparatus for a vehicle including a motor section receiving electric power from an outside, and generating power; a power transmission section rotated by driving of the motor section; a pair of pressing units receiving power from the power transmission section, and pressing a brake pad; a load transmission unit installed between the pair of pressing units, connected to each of the pair of pressing units, and transmitting a pressing load of any one of the pair of pressing units to the other pressing unit; and a transmission gear section restraint unit selectively restraining driving of the load transmission unit in conjunction with rotation of the power transmission section.

9 Claims, 19 Drawing Sheets

(56) References Cited

U.S. PATENT DOCUMENTS

| | | |
|---|---|---|
| 10,253,834 B2 | 4/2019 | Lee et al. |
| 10,823,242 B2 | 11/2020 | Choi |
| 2009/0294224 A1* | 12/2009 | Sakashita ............... F16D 65/568 188/72.2 |
| 2015/0129371 A1* | 5/2015 | Gutelius ............... F16D 55/228 188/72.1 |
| 2016/0290424 A1* | 10/2016 | Gutelius ............... F16D 65/183 |
| 2018/0135710 A1 | 5/2018 | Sala et al. |
| 2019/0063527 A1* | 2/2019 | Thomas .................. F16D 65/14 |
| 2019/0219117 A1* | 7/2019 | Choi ..................... F16D 65/183 |
| 2021/0016758 A1* | 1/2021 | Choi ..................... F16D 55/226 |
| 2021/0016759 A1* | 1/2021 | Choi ..................... B60T 13/741 |
| 2021/0016760 A1* | 1/2021 | Hong ................... F16D 55/226 |
| 2021/0016761 A1* | 1/2021 | Choi ..................... B60T 13/741 |
| 2021/0018054 A1* | 1/2021 | Jo ......................... B60T 13/741 |
| 2021/0086742 A1* | 3/2021 | Kwon ................. F16D 65/0081 |
| 2021/0122351 A1* | 4/2021 | Hong ................... F16D 65/183 |
| 2022/0381308 A1* | 12/2022 | Jo ......................... F16D 65/183 |
| 2023/0131289 A1* | 4/2023 | Choi ...................... B60T 1/065 188/156 |

FOREIGN PATENT DOCUMENTS

| | | |
|---|---|---|
| DE | 102016219409 A1 | 11/2017 |
| DE | 102018251782 A1 | 7/2019 |
| KR | 10-2019-0043713 | 4/2019 |
| KR | 10-2019-0087795 | 7/2019 |
| WO | WO-2017122739 A1 * | 7/2017 |

\* cited by examiner

PARKING BRAKE APPARATUS FOR VEHICLE

CROSS-REFERENCE TO RELATED APPLICATION

This application claims priority from and the benefit of Korean Patent Application No. 10-2020-0107107, filed on Aug. 25, 2020, which is hereby incorporated by reference for all purposes as if set forth herein.

BACKGROUND

Field

Exemplary embodiments of the present disclosure relate to a parking brake apparatus for a vehicle, and more particularly, to a parking brake apparatus for a vehicle capable of uniformly transmitting loads to a brake pad.

Discussion of the Background

In general, an actuator of an electronic parking brake for a vehicle is constructed by a motor and a power transmission device for operating friction pads installed in a caliper of a disc brake apparatus during parking.

When a driver pushes a parking brake switch, the rotational force of a motor of the actuator is transmitted to an input shaft of the caliper through the power transmission device such as a reduction gear. Through the rotation of the input shaft, a pressure connection sleeve is moved forward, and by the forward movement of the pressure connection sleeve, a piston which accommodates the pressure connection sleeve and a caliper housing are moved toward each other, such that two friction pads mounted to the piston and the caliper housing are pressed against both surfaces of a disc to restrain the rotation of the disc.

In the case where a plurality of pistons are provided and receive a driving force from a single actuator, loads may be non-uniformly transmitted to the plurality of pistons. In this case, uneven wear of friction pads may be caused, and the braking performance may be degraded.

The above information disclosed in this Background section is only for enhancement of understanding of the background of the invention and, therefore, it may contain information that does not constitute prior art.

SUMMARY

Exemplary embodiments of the present invention provide a parking brake apparatus for a vehicle capable of uniformly transmitting loads to a brake pad by a load transmission unit.

Exemplary embodiments also provide a parking brake apparatus for a vehicle capable of selectively limiting the rotation of a transmission gear section through a transmission gear section restraint unit and thereby selectively controlling a load balancing operation of piston sections.

Additional features of the invention will be set forth in the description which follows, and in part will be apparent from the description, or may be learned by practice of the invention.

An exemplary embodiment of the present invention provides a parking brake apparatus for a vehicle including: a motor section receiving electric power from an outside, and generating power; a power transmission section rotated by driving of the motor section; a pair of pressing units receiving power from the power transmission section, and pressing a brake pad; a load transmission unit installed between the pair of pressing units, connected to each of the pair of pressing units, and transmitting a pressing load of any one of the pair of pressing units to the other pressing unit; and a transmission gear section restraint unit selectively restraining driving of the load transmission unit in conjunction with rotation of the power transmission section.

Each of the pair of pressing units may include: a sun gear section rotated by receiving power from the power transmission section; a planetary gear section rotated by being meshed with the sun gear section; a carrier section coupled to the planetary gear section; and a piston section connected to the carrier section, and pressing the brake pad by being moved toward the brake pad through receiving rotational power from the planetary gear section.

The power transmission section may include a small diameter transmission gear which is rotated by driving of the motor section, transmits power to the sun gear section through a connection gear section and is coupled to the transmission gear section restraint unit.

The small diameter transmission gear and the connection gear section may be formed in the shapes of helical gears, and the small diameter transmission gear may move the transmission gear section restraint unit by being moved relative to the connection gear section when being rotated.

The connection gear section may include: a connection gear body coupled to the sun gear section; a connection wheel formed on an outer circumferential surface of the connection gear body, meshed with the small diameter transmission gear, and formed in the shape of a helical gear; and a connecting insertion part formed in a space inside a wall on which the connection wheel is formed, and having a ring gear section inserted therein.

The load transmission unit may include: a pair of ring gear sections; and one or more transmission gear sections disposed between the pair of ring gear sections, and meshed with the ring gear sections.

Each of the pair of ring gear sections may include: a ring gear inner part formed with an internal gear portion on an inner circumferential surface thereof to be meshed with the planetary gear section; and a ring gear outer part coupled to an outer surface of the ring gear inner part, and formed with an external gear portion on an outer circumferential surface thereof to be meshed with the transmission gear section.

The transmission gear section restraint unit may include: a restraint body disposed to face the transmission gear sections, and having a mounting hole part into which the small diameter transmission gear is mounted; and rotation-preventing engagement parts disposed on the restraint body, and formed to be meshed with transmission gear engagement parts of the transmission gear sections.

The rotation-preventing engagement parts and the transmission gear engagement parts may be formed in serrated shapes to be meshed with each other.

Rotation of the transmission gear sections may be restrained when the rotation-preventing engagement parts and the transmission gear engagement parts are meshed, and may be allowed when the rotation-preventing engagement parts and the transmission gear engagement parts are unmeshed.

The parking brake apparatus may further include: a restraint maintenance unit providing a pressing force to the transmission gear section restraint unit to maintain a state in which the transmission gear section restraint unit is meshed with the transmission gear sections.

The power transmission section may further include: a first transmission gear meshed with the motor section, and receiving power from the motor section; a second transmission gear connected to the first transmission gear, having a diameter smaller than the first transmission gear, and rotated in the same direction as the first transmission gear; and a large diameter transmission gear meshed with the second transmission gear, wherein the small diameter transmission gear is connected to the large diameter transmission gear, has a diameter smaller than the large diameter transmission gear, and is rotated in the same direction as the large diameter transmission gear.

In the parking brake apparatus for a vehicle according to the present disclosure, when a pressing load is concentrated on any one of a plurality of pressing units, a load transmission unit may transmit the pressing load to the remaining pressing unit, so that the pressing units may press a brake pad with uniform loads.

Also, according to the disclosure, by selectively limiting the rotation of a transmission gear section through a transmission gear section restraint unit, a load balancing operation of piston sections may be performed when a braking operation is performed and may be released when the braking operation is released.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
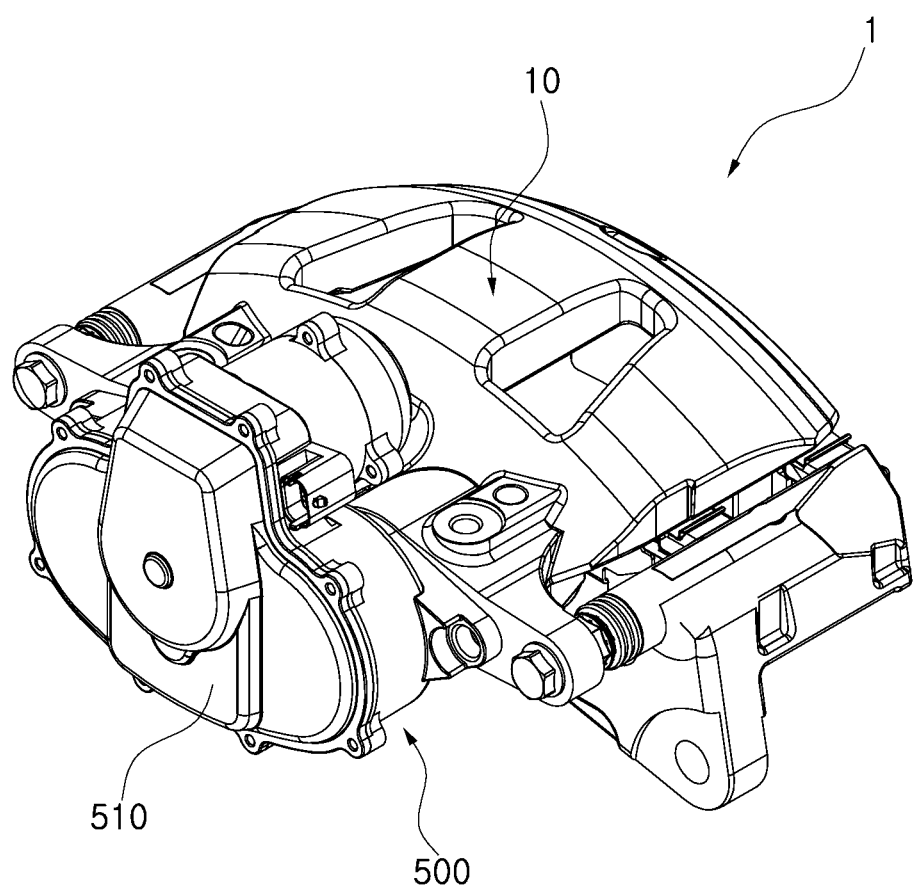
FIG. 1 is a perspective view illustrating a parking brake apparatus for a vehicle in accordance with an embodiment of the present disclosure.

A parking brake apparatus for a vehicle is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Furthermore, the terms used herein are defined by taking functions of the invention into account and can be changed according to the intention of users or operators or the practice. Therefore, definition of the terms should be made according to the overall disclosures set forth herein.

Figure 2:
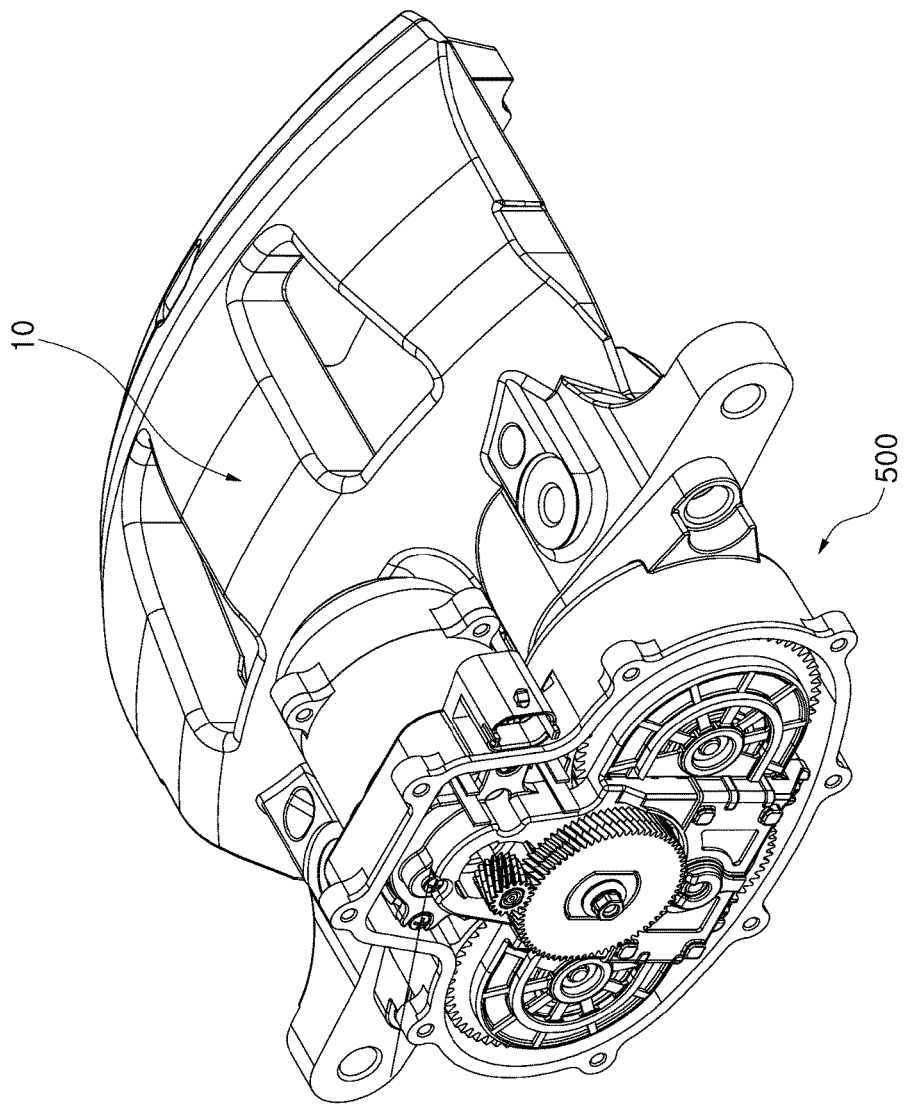
FIG. 2 is a partial perspective view illustrating the parking brake apparatus for a vehicle in accordance with the embodiment of the present disclosure.
Figure 3:
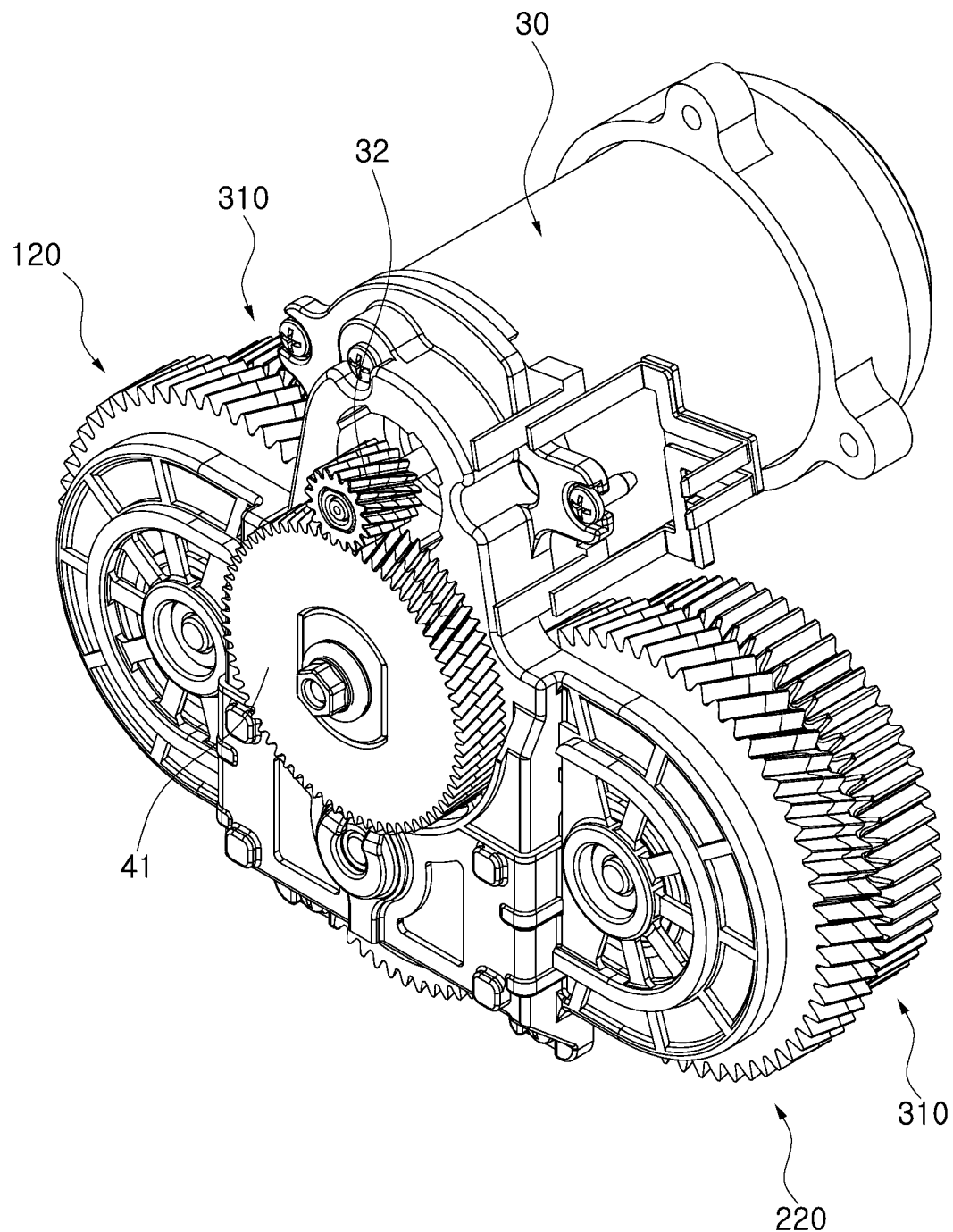
FIGS. 3 and 4 are partial perspective views illustrating a driving unit, a power transmission section, connection gear sections and ring gear sections in the parking brake apparatus for a vehicle in accordance with the embodiment of the present disclosure.
Figure 4:
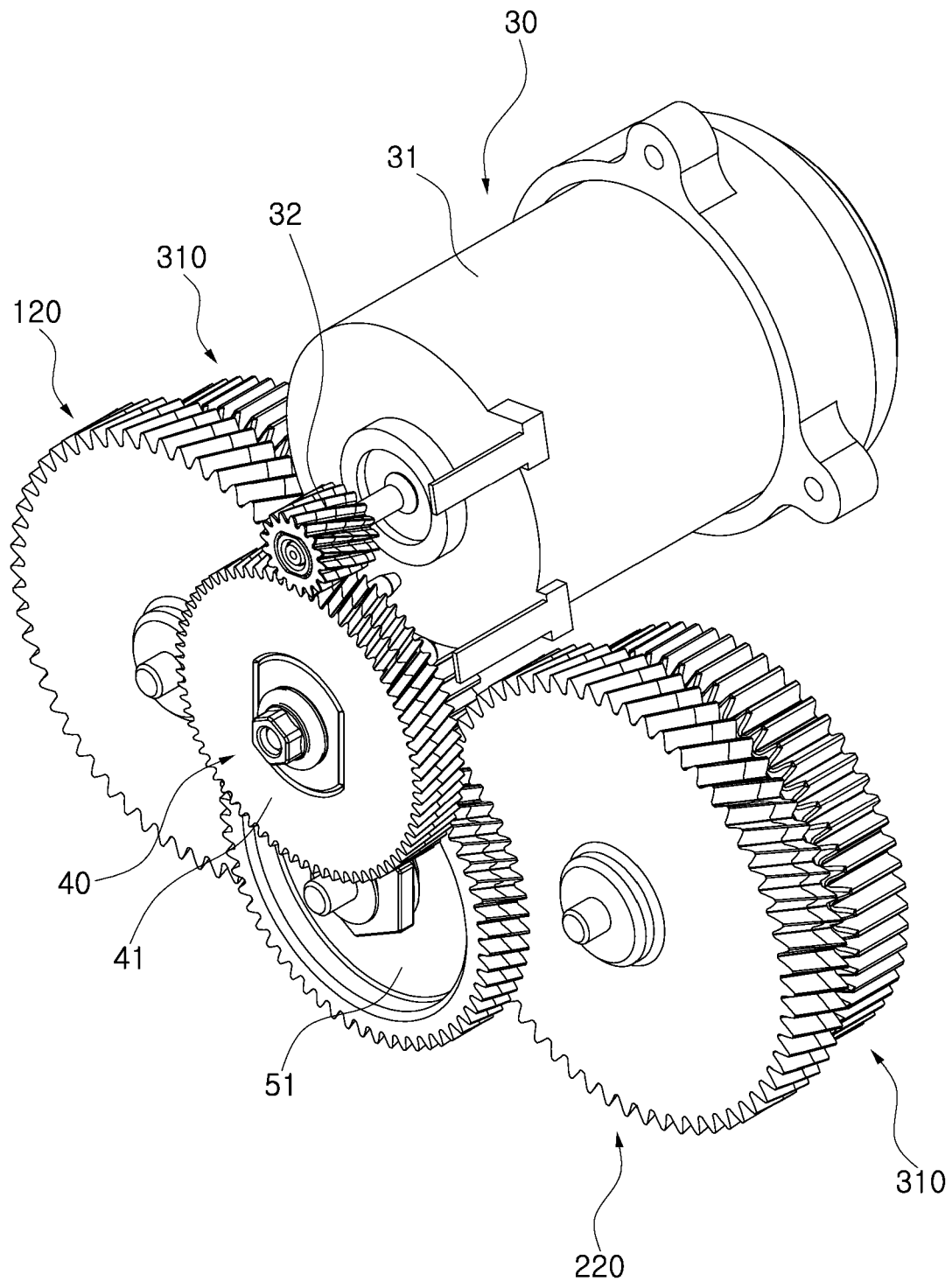
Figure 5:
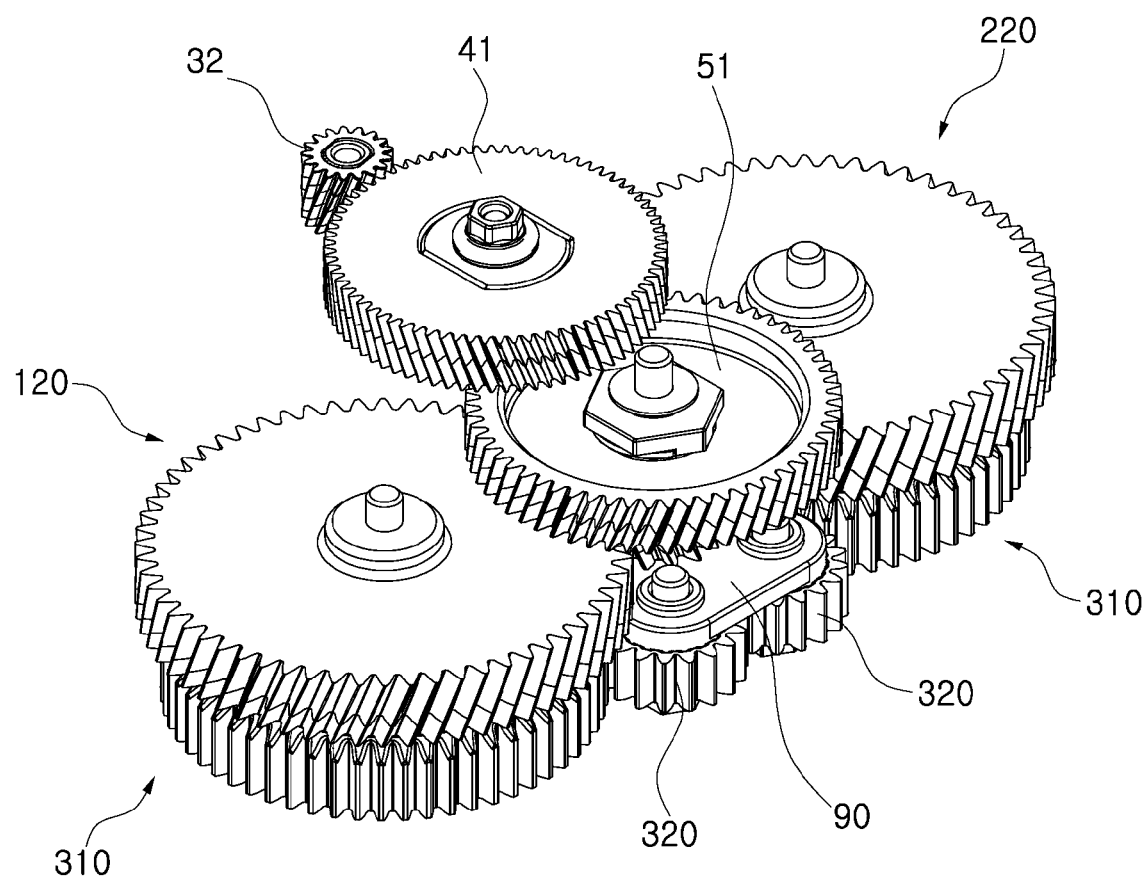
FIGS. 5 and 6 are views illustrating coupling relationships of the driving unit, the power transmission section, a transmission gear section restraint unit, transmission gear sections, the connection gear sections and the ring gear sections in the parking brake apparatus for a vehicle in accordance with the embodiment of the present disclosure.
Figure 6:
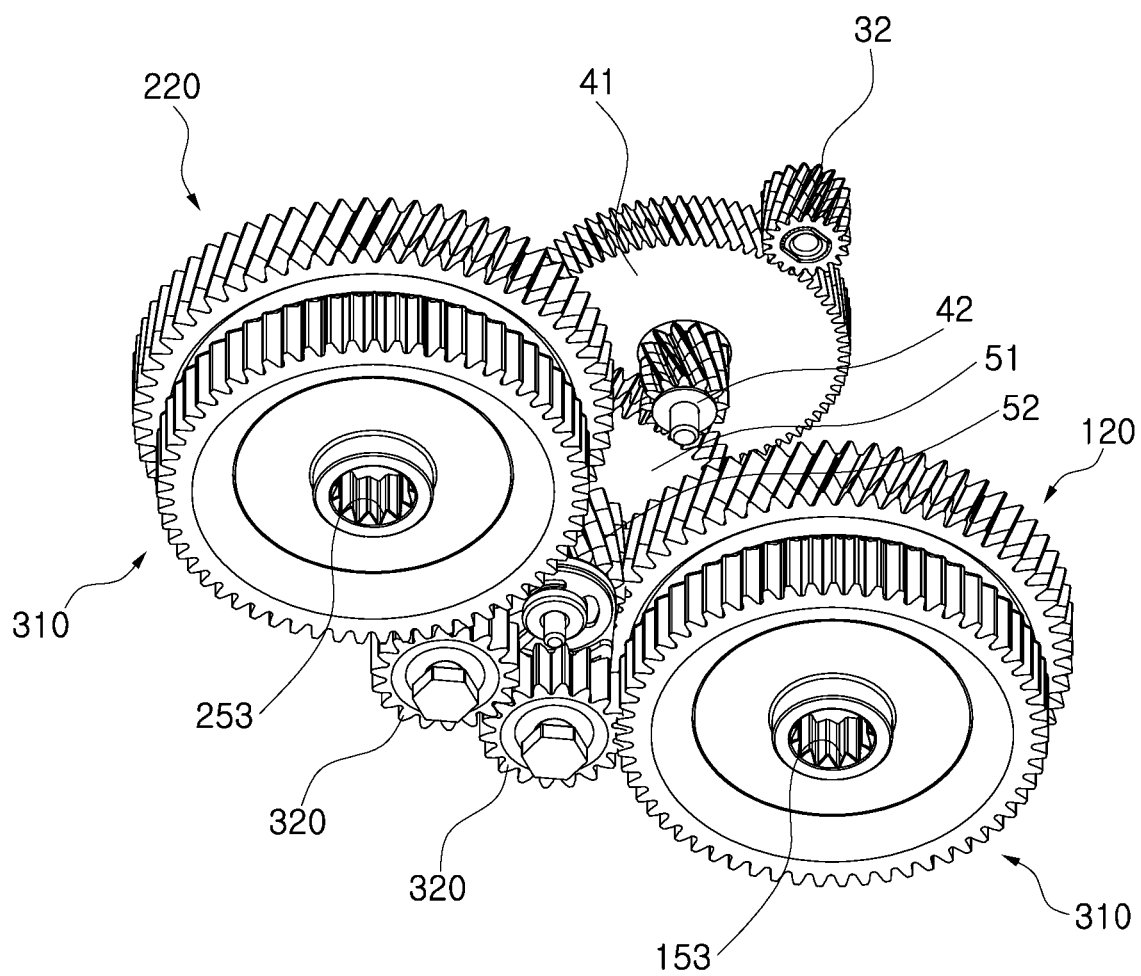
Figure 7:
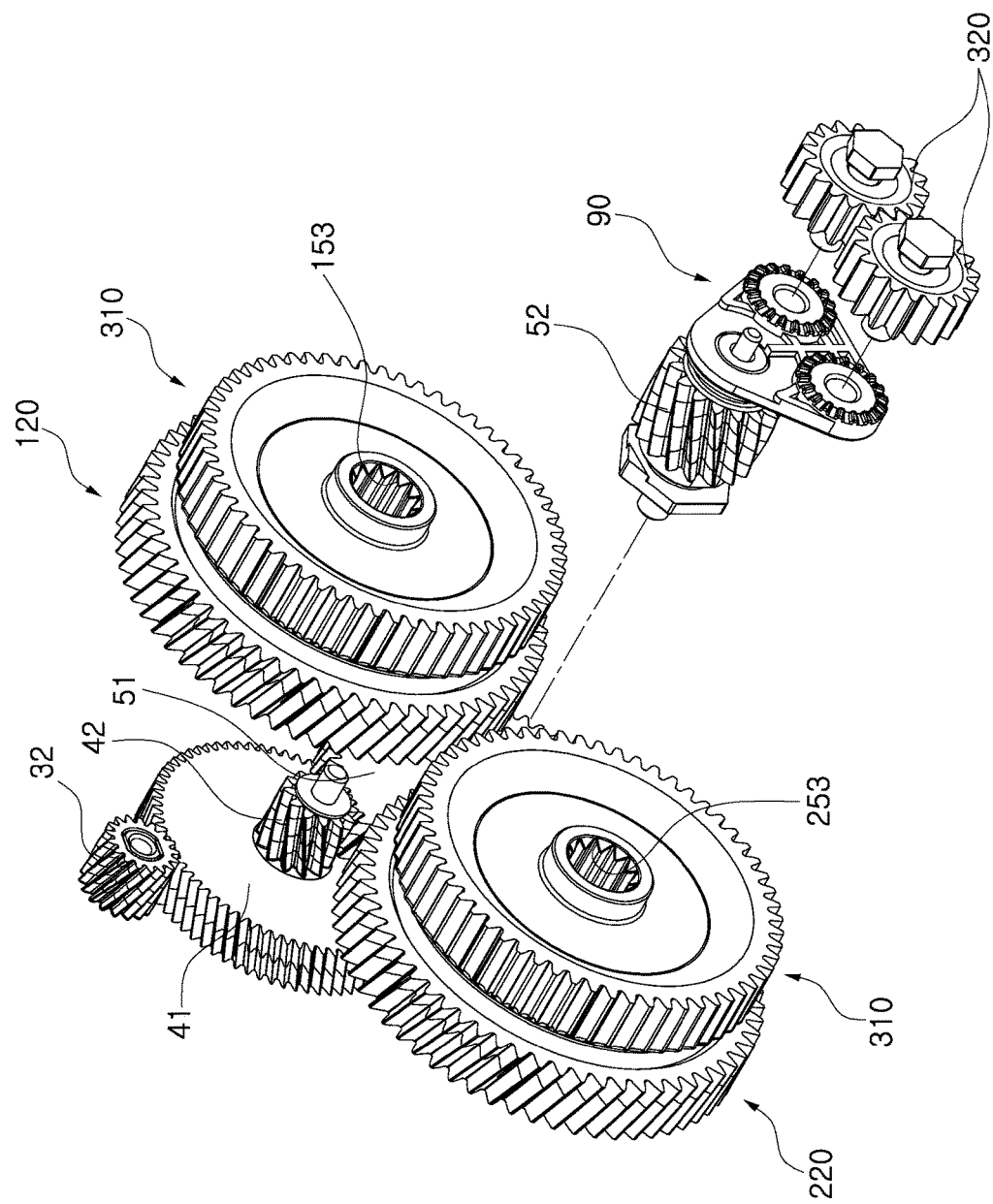
FIGS. 7 and 8 are views illustrating coupling relationships of a small diameter transmission gear, the transmission gear section restraint unit and the transmission gear sections in the parking brake apparatus for a vehicle in accordance with the embodiment of the present disclosure.
Figure 8:
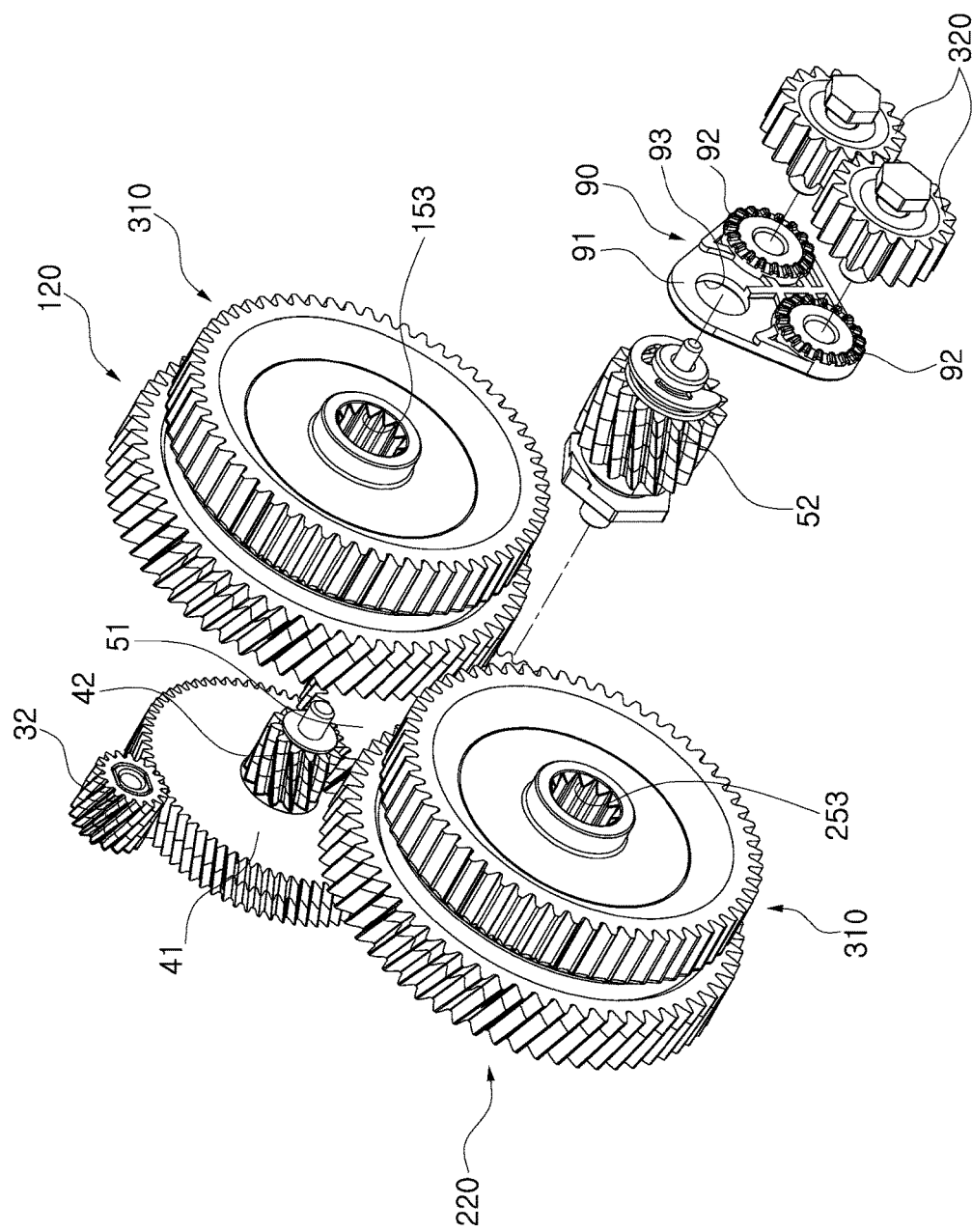
Figure 9:
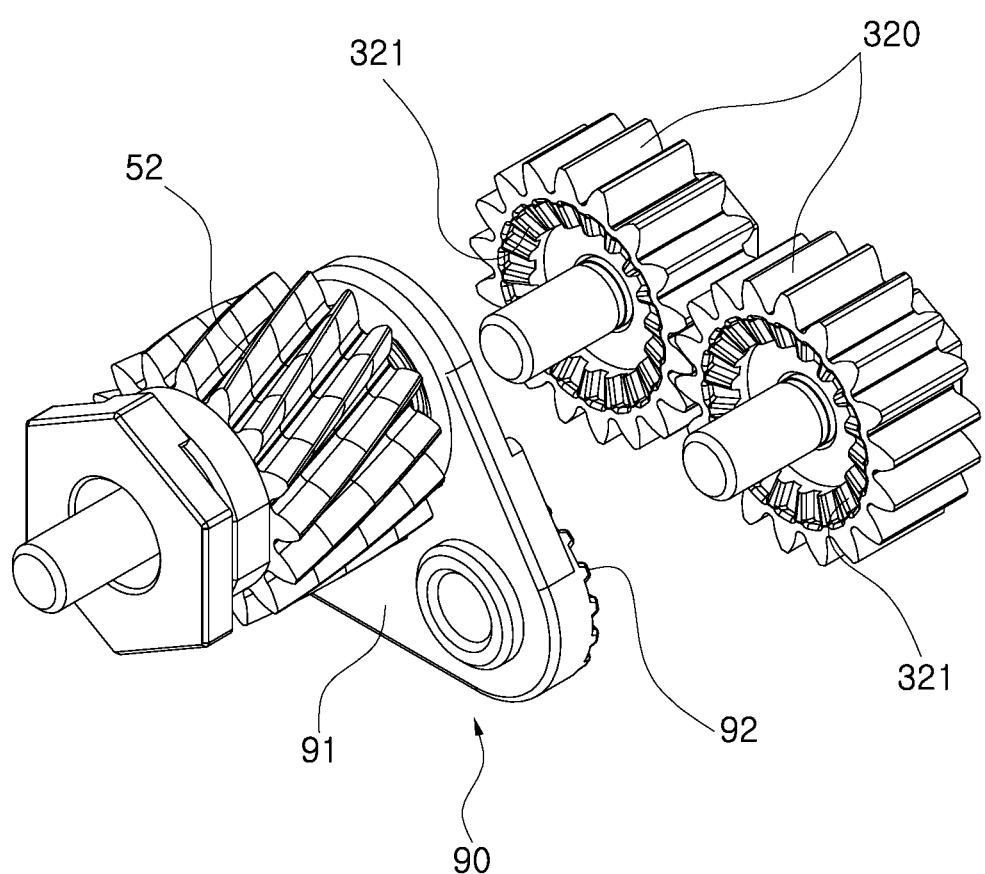
FIGS. 9 and 10 are views illustrating unmeshed and meshed states of the transmission gear section restraint unit and the transmission gear sections in the parking brake apparatus for a vehicle in accordance with the embodiment of the present disclosure.
Figure 10:
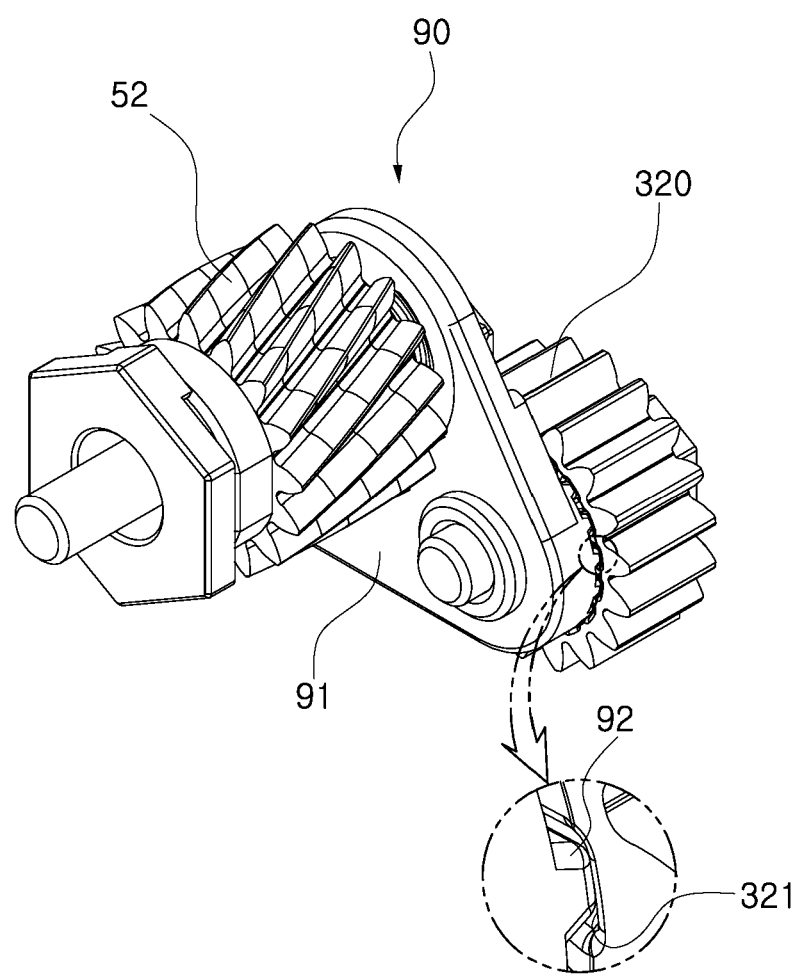
Figure 11:
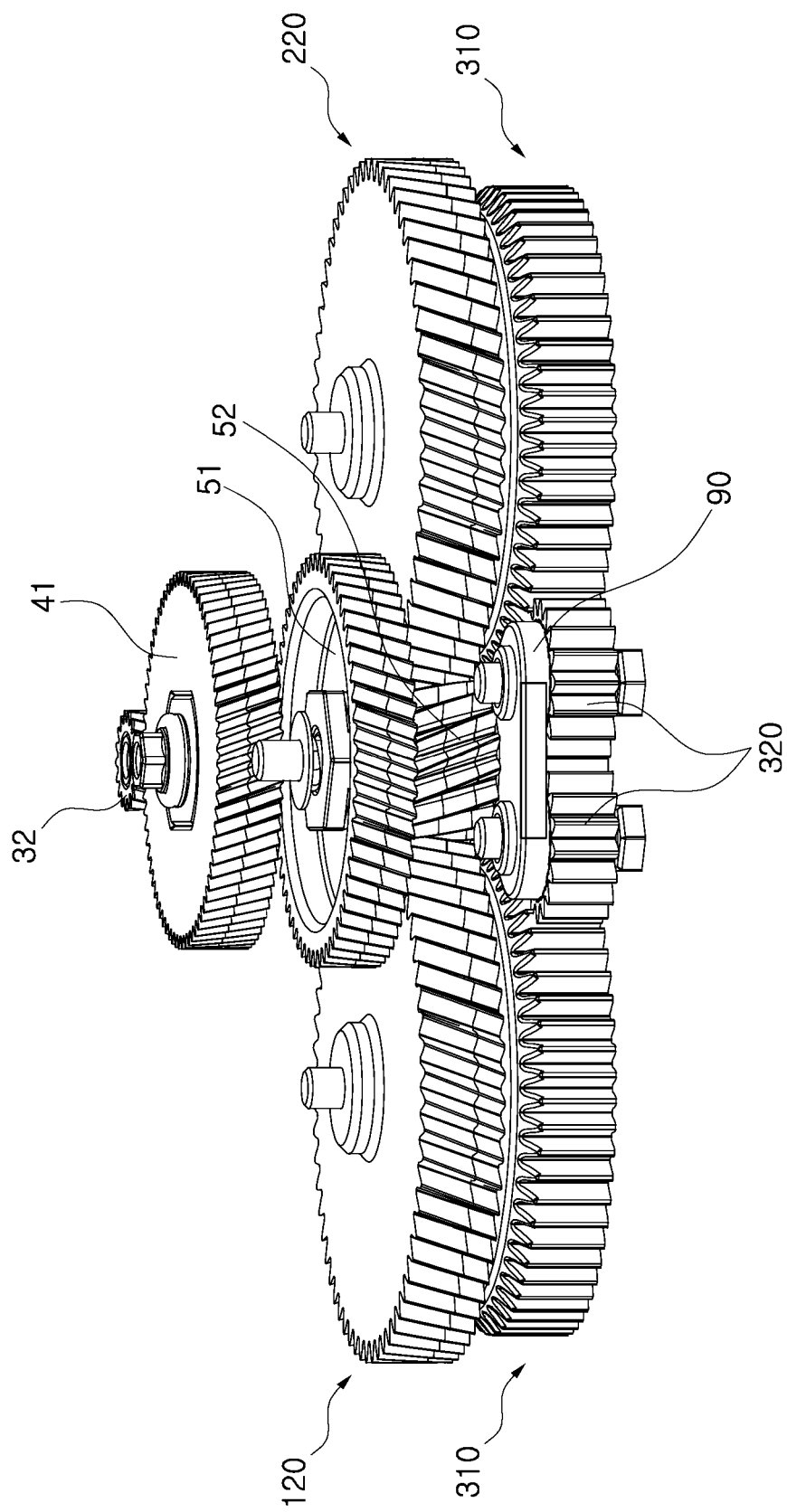
FIG. 11 is a front perspective view illustrating coupling relationships of the driving unit, the power transmission section, the transmission gear section restraint unit, the transmission gear sections, the connection gear sections and the ring gear sections in the parking brake apparatus for a vehicle in accordance with the embodiment of the present disclosure.
Figure 12:
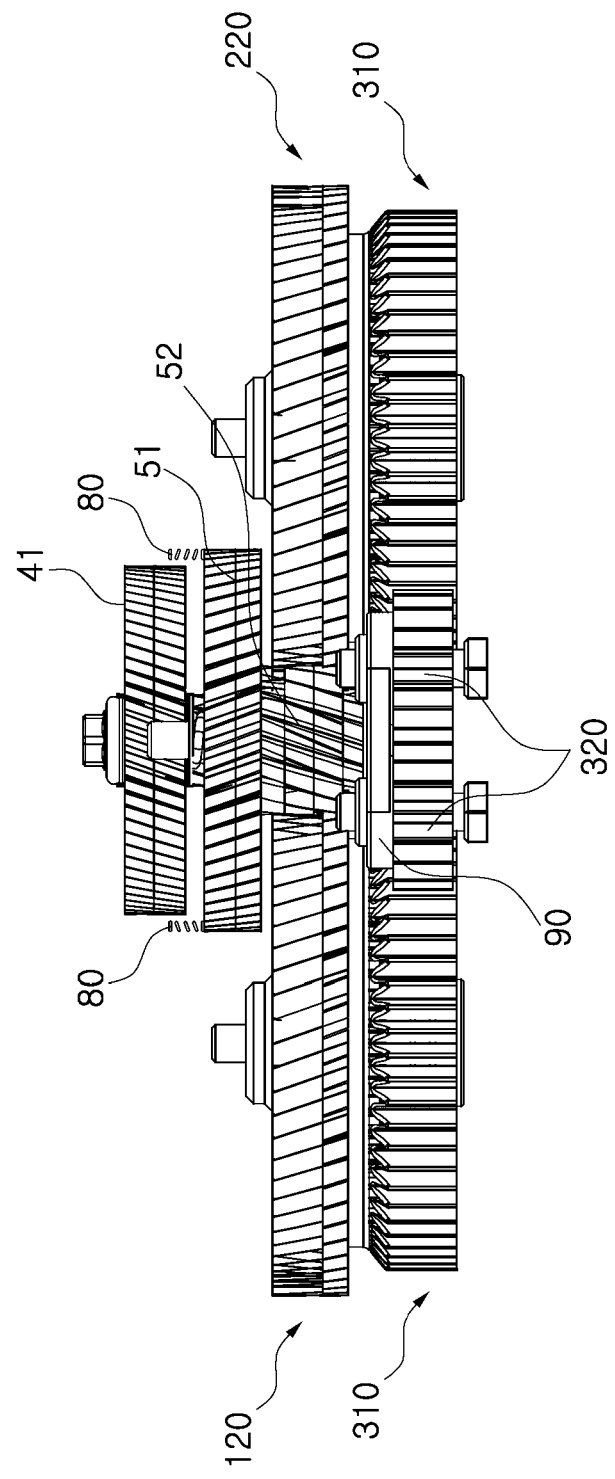
FIG. 12 is a view illustrating a state in which the transmission gear section restraint unit and the transmission gear sections are meshed in the parking brake apparatus for a vehicle in accordance with the embodiment of the present disclosure.
Figure 13:
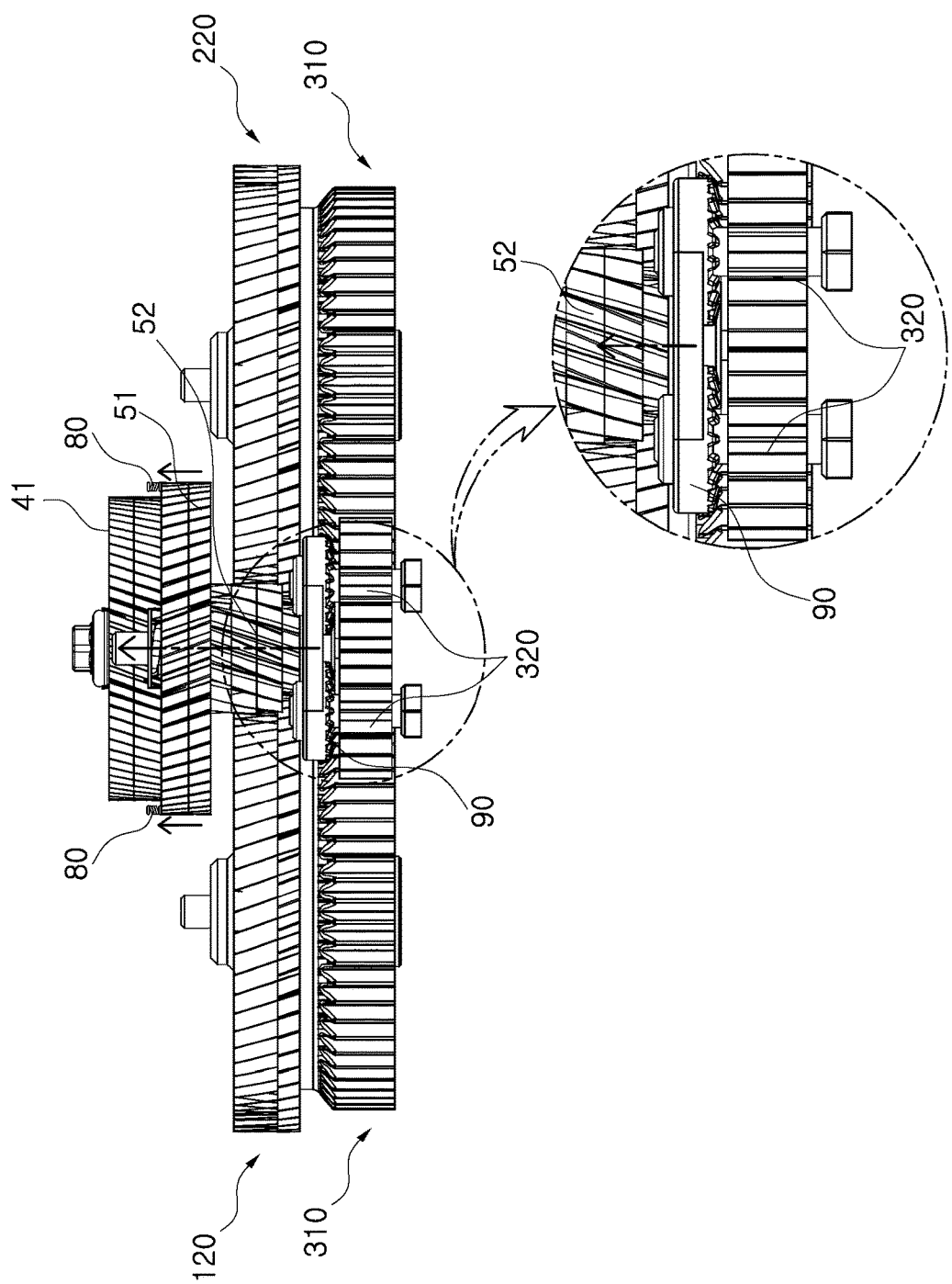
FIG. 13 is a view illustrating a state in which the transmission gear section restraint unit and the transmission gear sections are unmeshed in the parking brake apparatus for a vehicle in accordance with the embodiment of the present disclosure.
Figure 14:
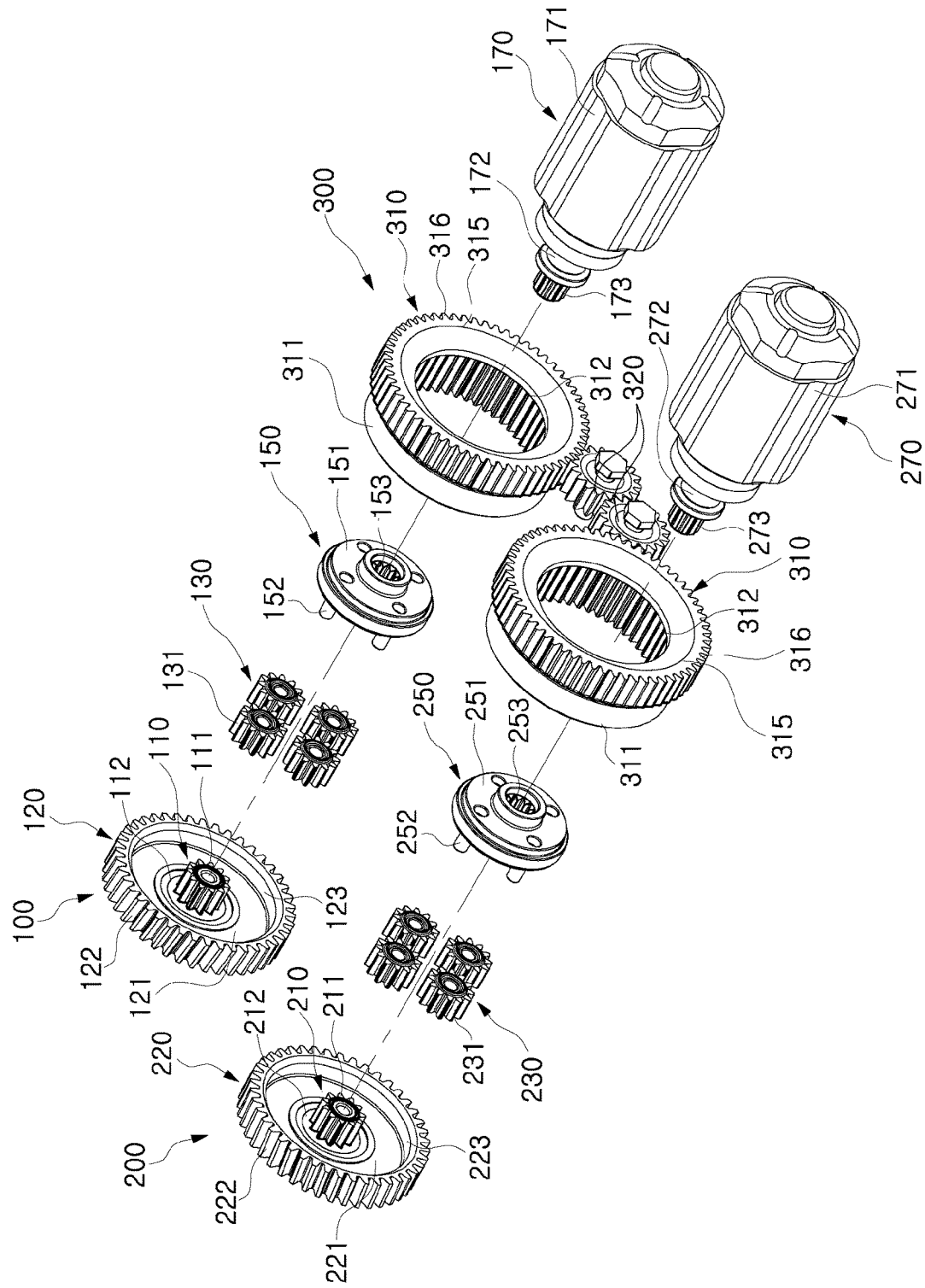
FIG. 14 is a partial front exploded view illustrating the parking brake apparatus for a vehicle in accordance with the embodiment of the present disclosure.
Figure 15:
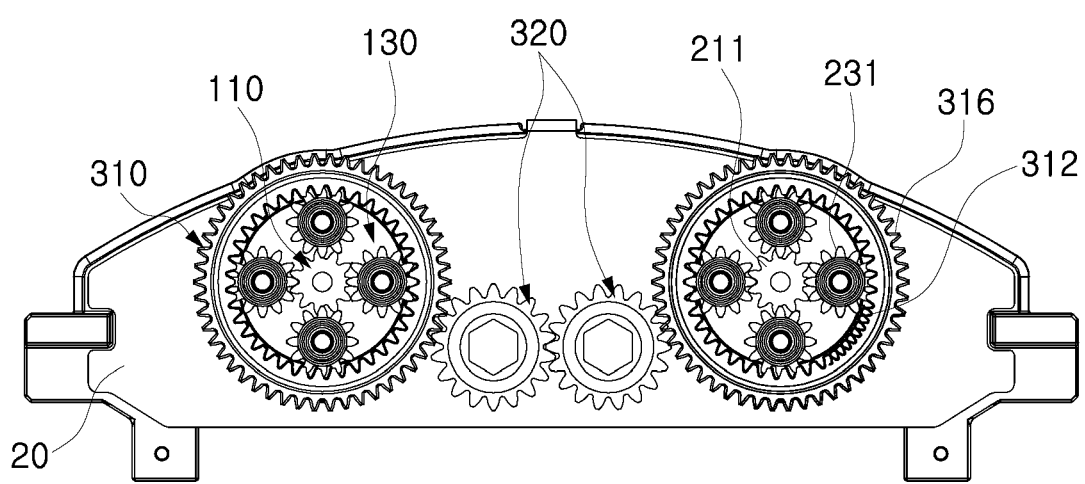
FIG. 15 is a front view illustrating the parking brake apparatus for a vehicle in accordance with the embodiment of the present disclosure.
Figure 16:
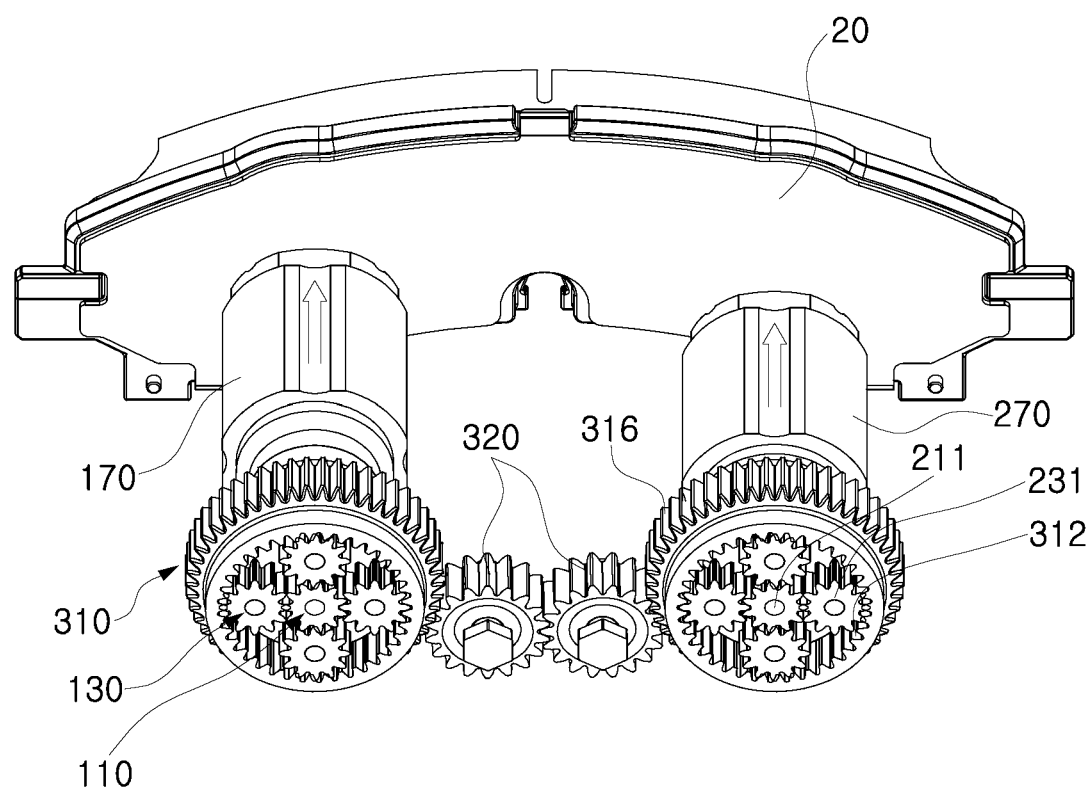
FIGS. 16, 17, and 18 are state views illustrating driving states of the parking brake apparatus for a vehicle in accordance with the embodiment of the present disclosure.
Figure 17:
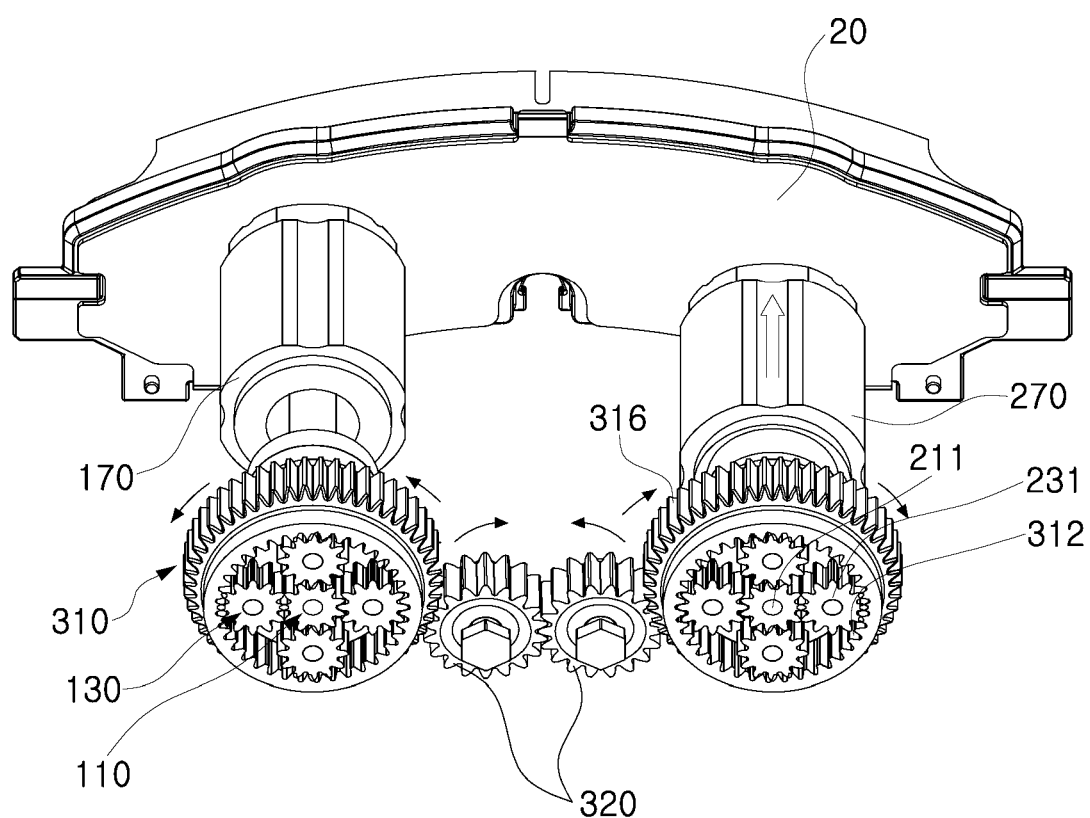
Figure 18:
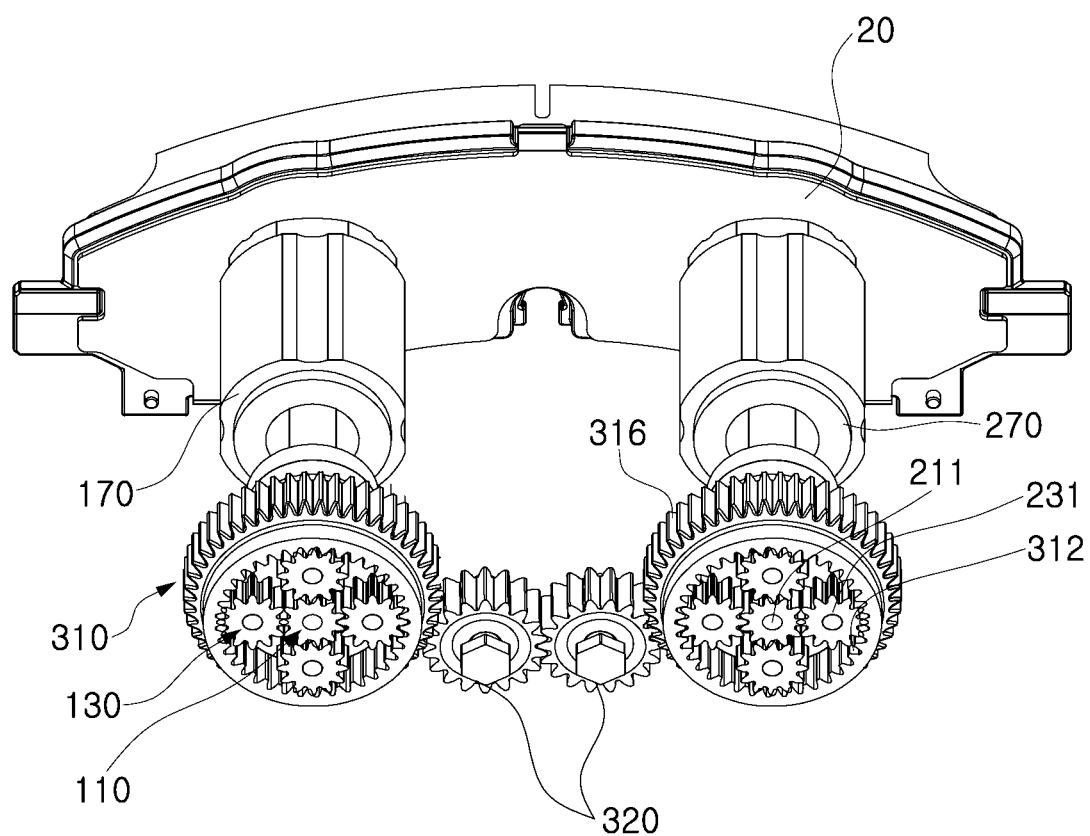
Figure 19:
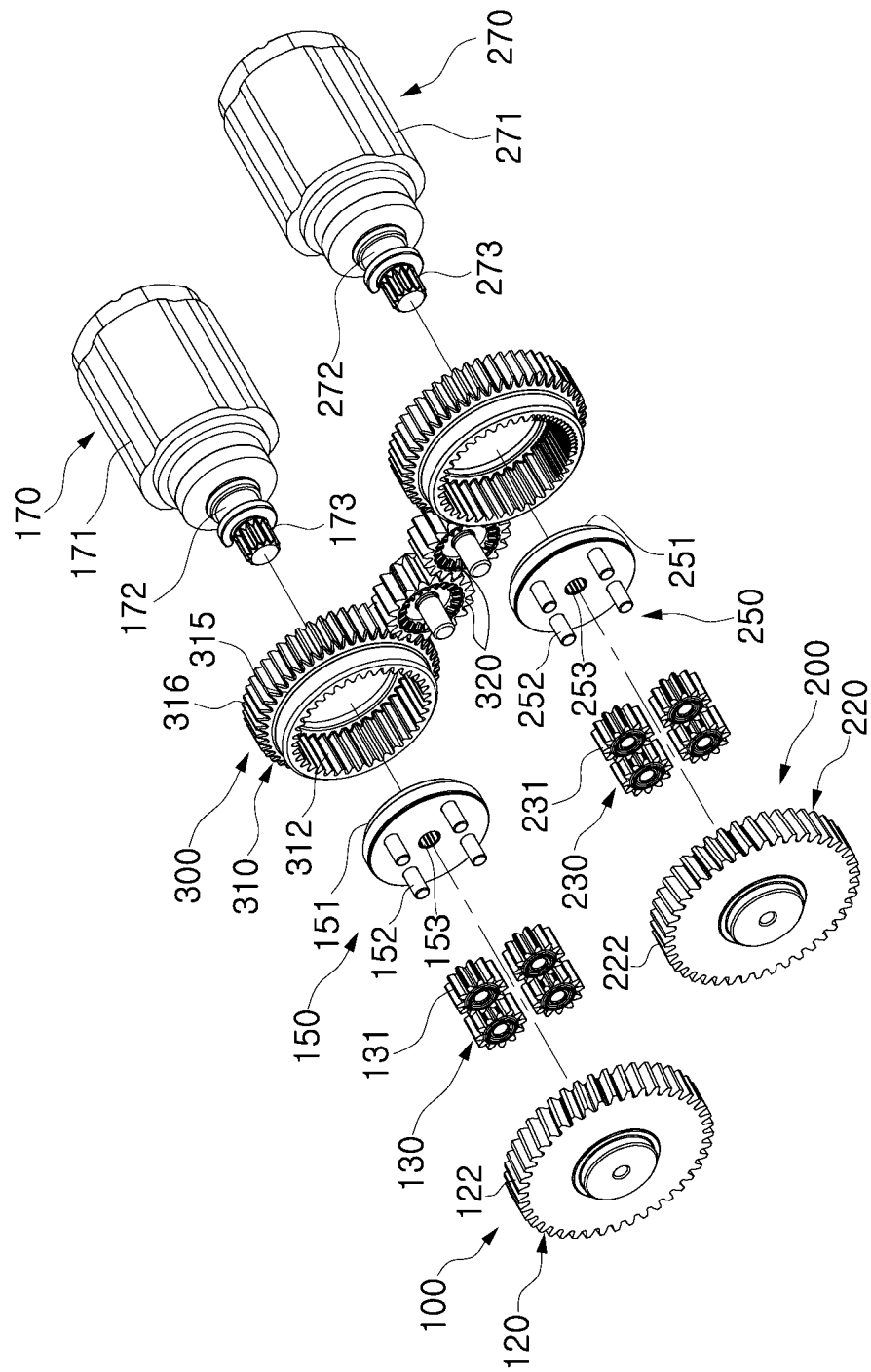
FIG. 19 is a partial rear exploded view illustrating the parking brake apparatus for a vehicle in accordance with the embodiment of the present disclosure.

FIG. 1 is a perspective view illustrating a parking brake apparatus for a vehicle in accordance with an embodiment of the present disclosure, FIG. 2 is a partial perspective view illustrating the parking brake apparatus for a vehicle in accordance with the embodiment of the present disclosure, FIGS. 3 and 4 are partial perspective views illustrating a driving unit, a power transmission section, connection gear sections and ring gear sections in the parking brake apparatus for a vehicle in accordance with the embodiment of the present disclosure, FIGS. 5 and 6 are views illustrating coupling relationships of the driving unit, the power transmission section, a transmission gear section restraint unit, transmission gear sections, the connection gear sections and the ring gear sections in the parking brake apparatus for a vehicle in accordance with the embodiment of the present disclosure, FIGS. 7 and 8 are views illustrating coupling relationships of a small diameter transmission gear, the transmission gear section restraint unit and the transmission gear sections in the parking brake apparatus for a vehicle in accordance with the embodiment of the present disclosure, FIGS. 9 and 10 are views illustrating unmeshed and meshed states of the transmission gear section restraint unit and the transmission gear sections in the parking brake apparatus for a vehicle in accordance with the embodiment of the present disclosure, FIG. 11 is a front perspective view illustrating coupling relationships of the driving unit, the power transmission section, the transmission gear section restraint unit, the transmission gear sections, the connection gear sections and the ring gear sections in the parking brake apparatus for a vehicle in accordance with the embodiment of the present disclosure, FIG. 12 is a view illustrating a state in which the transmission gear section restraint unit and the transmission gear sections are meshed in the parking brake apparatus for a vehicle in accordance with the embodiment of the present disclosure, FIG. 13 is a view illustrating a state in which the transmission gear section restraint unit and the transmission gear sections are unmeshed in the parking brake apparatus for a vehicle in accordance with the embodiment of the present disclosure, FIG. 14 is a partial front exploded view illustrating the parking brake apparatus for a vehicle in accordance with the embodiment of the present disclosure, FIG. 15 is a front view illustrating the parking brake apparatus for a vehicle in accordance with the embodiment of the present disclosure, FIGS. 16 to 18 are state views illustrating driving states of the parking brake apparatus for a vehicle in accordance with the embodiment of the present disclosure, and FIG. 19 is a partial rear exploded view illustrating the parking brake apparatus for a vehicle in accordance with the embodiment of the present disclosure.

Referring to FIGS. 1 to 13, a parking brake apparatus 1 for a vehicle in accordance with an embodiment of the present disclosure includes a driving unit, pressing units 100 and 200, and a load transmission unit 300.

The driving unit includes a motor section 30 which receives electric power from the outside and generates power. The motor section 30 includes a motor body 31 which generates power and a driving gear 32 which is rotated by the motor body 31.

In the present embodiment, the driving gear 32 is formed in the shape of a worm gear, and directly transmits power to the pressing units 100 and 200 or transmits power to the pressing units 100 and 200 through a power transmission section 40.

The driving unit includes the power transmission section 40. The motor section 30 of the driving unit may indirectly transmit generated power to the pressing units 100 and 200 through the power transmission section 40.

The power transmission section 40 includes a first transmission gear 41 and a second transmission gear 42.

The first transmission gear 41 is meshed with the driving gear 32 and is rotated according to the rotation of the driving gear 32.

The second transmission gear 42 is connected to the first transmission gear 41, and is rotated in the same direction as the first transmission gear 41 according to the rotation of the first transmission gear 41.

In the present embodiment, the first transmission gear 41 and the second transmission gear 42 are integrally coupled to each other. As the first transmission gear 41 has a larger diameter than the second transmission gear 42, a longitudinal section thereof has a T-shape.

The power transmission section 40 further includes a large diameter transmission gear 51 and a small diameter transmission gear 52.

The large diameter transmission gear 51 is meshed with the second transmission gear 42 and is rotated according to the rotation of the second transmission gear 42.

The small diameter transmission gear 52 is connected to the large diameter transmission gear 51, and is rotated in the same direction as the large diameter transmission gear 51 according to the rotation of the large diameter transmission gear 51. The small diameter transmission gear 52 is formed in the shape of a helical gear.

In the present embodiment, the large diameter transmission gear 51 and the small diameter transmission gear 52 are integrally coupled to each other. As the large diameter transmission gear 51 has a larger diameter than the small diameter transmission gear 52, a longitudinal section thereof has a T-shape.

The parking brake apparatus 1 for a vehicle in accordance with the present embodiment further includes a transmission gear section restraint unit 90.

The transmission gear section restraint unit 90 may selectively restrain the rotation of transmission gear sections 320. That is to say, in the case where the rotation of the transmission gear sections 320 is not necessary, the rotation of the transmission gear sections 320 may be restrained by the operation of the transmission gear section restraint unit 90.

The transmission gear section restraint unit 90 includes a restraint body 91, rotation-preventing engagement parts 92, and a mounting hole part 93.

The restraint body 91 has a shape which does not interfere with the rotation of connection gear sections 120 and 220 and ring gear sections 310.

In the present embodiment, the restraint body 91 is formed in a triangular shape, and is disposed between the connection gear section 120 and the connection gear section 220 which are spaced apart from each other and between the ring gear section 310 and the ring gear section 310 which are spaced apart from each other.

Therefore, even though the restraint body 91 is moved in conjunction with the movement of the small diameter transmission gear 52, the restraint body 91 does not collide with the connection gear sections 120 and 220 and the ring gear sections 310. Thus, the restraint body 91 does not interfere with the rotation of the connection gear sections 120 and 220 and the ring gear sections 310.

The rotation-preventing engagement parts 92 are disposed on the restraint body 91. The rotation-preventing engagement parts 92 are formed on one surface of the restraint body 91, which faces the transmission gear sections 320, in order to prevent the rotation of the transmission gear sections 320.

The mounting hole part 93 is formed in the restraint body 91 to allow the small diameter transmission gear 52 to be mounted therein. The small diameter transmission gear 52 is rotated by the rotation of the large diameter transmission gear 51, and transmits a rotational force to the connection gear sections 120 and 220.

The small diameter transmission gear 52 is rotatably installed in the mounting hole part 93. As the small diameter transmission gear 52 is mounted into the mounting hole part 93, the restraint body 91 is moved in conjunction with the movement of the small diameter transmission gear 52.

The rotation-preventing engagement parts 92 are formed to be meshed with transmission gear engagement parts 321 which are formed in the transmission gear sections 320.

Each rotation-preventing engagement part 92 has prominences and depressions which are alternately disposed toward the transmission gear section 320, and each transmission gear engagement part 321 has prominences and depressions which are alternately disposed toward the restraint body 91. In other words, the rotation-preventing engagement part 92 and the transmission gear engagement part 321 are formed in serrated shapes to be meshed with each other.

By this fact, as the prominences and depressions of the rotation-preventing engagement parts 92 and the prominences and depressions of the transmission gear engagement parts 321 are engaged with each other, the rotation-preventing engagement parts 92 and the transmission gear engagement parts 321 are meshed with each other.

If the rotation-preventing engagement parts 92 and the transmission gear engagement parts 321 are meshed, the rotation of the transmission gear sections 320 is limited, that is, restrained, by the transmission gear section restraint unit 90.

Namely, the transmission gear sections 320 cannot be rotated in a state in which the rotation-preventing engagement parts 92 and the transmission gear engagement parts 321 are meshed, and can be rotated only in a state in which the rotation-preventing engagement parts 92 and the transmission gear engagement parts 321 are unmeshed.

In the case where the parking brake apparatus 1 for a vehicle is in an inoperative state, that is, in the case where a braking load is not applied, the transmission gear section restraint unit 90 is meshed with the transmission gear sections 320. Thus, the rotation of the transmission gear sections 320 is restrained by the transmission gear section restraint unit 90.

The parking brake apparatus 1 for a vehicle in accordance with the present embodiment may further include a restraint maintenance unit 80.

The restraint maintenance unit 80 provides a pressing force to the transmission gear section restraint unit 90 in order to maintain a state in which the transmission gear section restraint unit 90 is meshed with the transmission gear sections 320.

The restraint maintenance unit 80 may directly provide a pressing force to the transmission gear section restraint unit 90, or may provide a pressing force through the large diameter transmission gear 51 or the small diameter transmission gear 52 which is integrated with the transmission gear section restraint unit 90.

The present embodiment illustrates that the restraint maintenance unit 80 provides a pressing force to the transmission gear section restraint unit 90 through the large diameter transmission gear 51.

The restraint maintenance unit 80 may include an elastic member. In a state in which one end of the elastic member 80 is fixed, the other end of the elastic member 80 may provide a pressing force, by an elastic restoring force, to the large diameter transmission gear 51.

Since the transmission gear section restraint unit 90 always provides a pressing force toward the transmission gear sections 320 through the restraint maintenance unit 80, the coupling forces between the rotation-preventing engagement parts 92 and the transmission gear engagement parts 321 are increased, and it is possible to prevent the meshing between the rotation-preventing engagement parts 92 and the transmission gear engagement parts 321 from being released in a state in which a separate external force is not provided (see FIG. 12).

The pressing force provided from the restraint maintenance unit 80 to the transmission gear section restraint unit 90 is set to a magnitude smaller than an upward axial force (an axial force in a direction facing away from the transmission gear sections 320 in FIG. 13) which is generated in the small diameter transmission gear 52 as will be described later.

If the upward axial force is generated as the small diameter transmission gear 52 is rotated, the transmission gear section restraint unit 90 integrated with the small diameter transmission gear 52 is moved together with the small diameter transmission gear 52 while overcoming the pressing force of the restraint maintenance unit 80 (see FIG. 13).

As the transmission gear section restraint unit 90 is moved in the direction facing away from the transmission gear sections 320, the meshing between the rotation-preventing engagement parts 92 and the transmission gear engagement parts 321 is released, and thus, the transmission gear sections 320 are in a rotatable state.

In the case where the parking brake apparatus 1 for a vehicle is in an operating state, that is, in the case where a braking load is applied, the restraint on the rotation of the transmission gear sections 320 is released by the upward axial force in the small diameter transmission gear 52, and thus, the rotation of the transmission gear sections 320 becomes possible. As a consequence, even when a pressing load is concentrated on any one of the plurality of pressing units 100 and 200, the pressing load may be transmitted to the remaining pressing unit so that the pressing units 100 and 200 may press a brake pad 20 with uniform loads.

In the case where the operation of the parking brake apparatus 1 for a vehicle is ended, that is, in the case where the braking load is removed, a downward axial force (an axial force in a direction facing the transmission gear sections 320 in FIG. 13) is generated in the small diameter transmission gear 52.

By this fact, the small diameter transmission gear 52 returns to the position of FIG. 12, and, as the rotation-preventing engagement parts 92 and the transmission gear engagement parts 321 are meshed, the rotation of the transmission gear sections 320 is blocked.

If the small diameter transmission gear 52 returns to the original position, the transmission gear section restraint unit 90 integrated with the small diameter transmission gear 52 may be meshed with the transmission gear sections 320 by the pressing force of the restraint maintenance unit 80.

If the braking load is removed in the parking brake apparatus 1 for a vehicle, since the rotation of the transmission gear sections 320 is blocked, a piston load balancing operation through the transmission gear sections 320 is blocked.

Therefore, in a process in which the braking operation of the parking brake apparatus 1 for a vehicle is released, respective piston sections 170 and 270 are separated from the brake pad 20 without a separate load balancing operation, and thus, a braking release operation may be performed in real time, whereby it is possible to improve the braking release performance.

Referring to FIGS. 1, 2 and 14 to 19, the parking brake apparatus 1 for a vehicle in accordance with the present embodiment includes a mounting case 500 and a mounting cover 510.

The driving unit, the pressing units 100 and 200 and the load transmission unit 300 are disposed in the mounting case 500. The mounting cover 510 is detachably coupled to the mounting case 500, and closes one side opening of the mounting case 500 in order to prevent foreign matters from entering the inside of the mounting case 500.

The pressing units 100 and 200 in accordance with the present embodiment are installed in a caliper housing 10, receive power from the driving unit, and press the brake pad 20 which is brought into frictional contact with a disc (not illustrated).

A plurality of pressing units 100 and 200 are provided. The plurality of pressing units 100 and 200 are disposed side by side. The pressing units 100 and 200 are symmetrically installed at left and right sides (in FIG. 15) with respect to the center portion of the brake pad 20.

The pressing units 100 and 200 receive power from the driving unit, and press the brake pad 20 with the same pressing loads. The brake pad 20 is moved toward the disc by such pressing forces, and a braking force is generated due to the friction between the brake pad 20 and the disc.

The pressing units 100 and 200 in accordance with the present embodiment include sun gear sections 110 and 210, the connection gear sections 120 and 220, planetary gear sections 130 and 230, carrier sections 150 and 250, and the piston sections 170 and 270.

Meanwhile, in the illustration of FIGS. 15 to 18, connection gear bodies 121 and 221 of the connection gear sections 120 and 220 are omitted for the sake of convenience in explanation.

The connection gear sections 120 and 220 include the connection gear bodies 121 and 221, connection wheels 122 and 222, and connecting insertion parts 123 and 223.

The connection gear sections 120 and 220 include the connection wheels 122 and 222 formed on the outer circumferential surfaces thereof to be meshed with the driving unit, specifically, the small diameter transmission gear 52 of the power transmission section 40.

The power generated in the motor section 30 is transmitted to the connection wheels 122 and 222 through the power transmission section 40. That is to say, the power of the motor section 30 is transmitted to the connection gear sections 120 and 220 and rotates the connection gear sections 120 and 220.

Like the small diameter transmission gear 52, each of the connection wheels 122 and 222 is formed in the shape of a helical gear.

The connecting insertion parts 123 and 223 are formed in spaces inside the connection wheels 122 and 222. In other words, the connection wheels 122 and 222 are formed on the outsides of walls formed on the outer circumferential surfaces of the connection gear bodies 121 and 221, and the connecting insertion parts 123 and 223 are formed in the spaces inside the walls on which the connection wheels 122 and 222 are formed.

The ring gear sections 310, specifically, ring gear inner parts 311, are inserted into the connecting insertion parts 123 and 223. The connecting insertion parts 123 and 223 are formed in the shapes of grooves.

The sun gear sections 110 and 210 are rotated by receiving power from the driving unit. According to the present embodiment, the sun gear sections 110 and 210 are coupled to the connection gear sections 120 and 220. The sun gear sections 110 and 210 may be rotated through the connection gear sections 120 and 220 which are dynamically connected to the driving unit.

The sun gear sections 110 and 210 include sun gears 111 and 211 and sun gear connection bodies 112 and 212.

The sun gear connection bodies 112 and 212 are coupled to the connection gear bodies 121 and 221. The sun gears 111 and 211 are formed at the center portions of the sun gear connection bodies 112 and 212, and have outer circumferential surfaces formed in the shapes of gears in order to be meshed with the planetary gear sections 130 and 230.

The rotation centers of the sun gear sections 110 and 210 are concentric with the rotation centers of the connection gear sections 120 and 220. If power is transmitted to the connection gear sections 120 and 220 by the power transmission section 40, the connection gear sections 120 and 220 and the sun gear sections 110 and 210 are rotated about the same rotation axes.

The sun gear sections 110 and 210 are disposed inside the inner circumferential surfaces of the connection gear sections 120 and 220 on which the connecting insertion parts 123 and 223 are formed.

The sun gear sections 110 and 210 may be integrally formed with the connection gear sections 120 and 220. Alternatively, the sun gear sections 110 and 210 may be formed as separate bodies from the connection gear sections 120 and 220, and may be integrated with the connection gear sections 120 and 220 through coupling.

As the sun gear sections 110 and 210 are integrally formed with the connection gear sections 120 and 220 or are integrated with the connection gear sections 120 and 220, if the connection gear sections 120 and 220 which are driven by receiving power from the power transmission section 40 are rotated, the sun gear sections 110 and 210 are also rotated together.

The sun gears 111 and 211 are disposed inside the planetary gear sections 130 and 230, respectively, each of which is provided with a plurality of gears. The planetary gear sections 130 and 230 rotate and revolve while being meshed with the sun gears 111 and 211.

The planetary gear sections 130 and 230 include a plurality of planetary gears 131 and 231. The present embodiment illustrates that the numbers of the planetary gears 131 and 231 each are exemplified as four. However, it is to be noted that the present embodiment is not limited thereto, and thus, the numbers of the planetary gears 131 and 231 may each be three or less or five or more.

The plurality of planetary gears 131 and 231 are disposed at equal angles about the rotation centers of the sun gears 111 and 211. The plurality of planetary gears 131 and 231 are meshed with the sun gears 111 and 211, and rotate and/or revolve when the sun gears 111 and 211 are rotated.

The planetary gear sections 130 and 230 are coupled to the carrier sections 150 and 250. In the case where the plurality of planetary gears 131 and 231 revolve around the sun gears 111 and 211, the carrier sections 150 and 250 are also rotated in a clockwise or counterclockwise direction (in FIG. 15).

As the carrier sections 150 and 250 are rotated, the piston sections 170 and 270 are moved toward the brake pad 20 and press the brake pad 20.

The carrier sections 150 and 250 include carrier bodies 151 and 251, carrier rotation shafts 152 and 252, and carrier connection parts 153 and 253.

The carrier rotation shafts 152 and 252 are formed on the carrier bodies 151 and 251 to project toward the planetary gear sections 130 and 230.

The carrier rotation shafts 152 and 252 are provided in plural numbers that are the same as the numbers of the planetary gears 131 and 231 of the planetary gear sections 130 and 230, and are coupled through the planetary gears 131 and 231 of the planetary gear sections 130 and 230. Due to this fact, the planetary gears 131 and 231 of the planetary gear sections 130 and 230 may perform rotating motion while being rotated on the carrier rotation shafts 152 and 252.

The carrier connection parts 153 and 253 are formed on the inner circumferential surfaces of the carrier bodies 151 and 251, and are connected to piston connection parts 173 and 273 of the piston sections 170 and 270.

In the present embodiment, the carrier connection parts 153 and 253 have the shapes of grooves, and the piston connection parts 173 and 273 have the shapes of protrusions which are inserted into the carrier connection parts 153 and 253, respectively.

Alternatively, the piston connection parts 173 and 273 may have the shapes of grooves, and the carrier connection parts 153 and 253 may have the shapes of protrusions which are inserted into the piston connection parts 173 and 273, respectively.

The carrier connection parts 153 and 253 and the piston connection parts 173 and 273 may be spline-coupled to each other. Of course, the carrier sections 150 and 250 and the piston sections 170 and 270 may be coupled in other ways, for example, screw coupling or the like, in addition to the spline coupling.

The piston sections 170 and 270 are connected with the carrier sections 150 and 250. The piston sections 170 and 270 are rotated together as the carrier sections 150 and 250 are rotated.

The piston sections 170 and 270 include piston bodies 171 and 271, piston shafts 172 and 272, and the piston connection parts 173 and 273.

The piston bodies 171 and 271 are formed to be internally hollow, and are disposed to be capable of being brought into contact with the brake pad 20 by the movement thereof. The piston bodies 171 and 271 may be formed in cylindrical shapes.

The piston bodies 171 and 271 are coupled with the piston shafts 172 and 272, and the piston connection parts 173 and 273 are formed at ends of the piston shafts 172 and 272, that is, ends of the piston shafts 172 and 272 which face the carrier sections 150 and 250.

When the carrier sections 150 and 250 are rotated, the piston connection parts 173 and 273 which are spline-coupled to the carrier connection parts 153 and 253 are rotated, and thereby, the rotational motion of the carrier sections 150 and 250 is converted into the linear motion of the piston sections 170 and 270.

Due to the linear movement of the piston sections 170 and 270, the piston sections 170 and 270 are moved toward the brake pad 20. Therefore, as the piston sections 170 and 270 are brought into contact with the brake pad 20 and press the brake pad 20, a braking force is generated due to the friction between the brake pad 20 and the disc.

The load transmission unit 300 is connected to each of the pair of pressing units 100 and 200, and transmits a pressing load of any one of the pressing units 100 and 200 to the other of the pressing units 100 and 200.

The load transmission unit 300 in accordance with the present embodiment includes a pair of ring gear sections 310, and one or more transmission gear sections 320.

The pair of ring gear sections 310 may be rotated by being meshed with the planetary gear sections 130 and 230, respectively.

Alternatively, the pair of ring gear sections 310 may be indirectly meshed by the medium of the one or more transmission gear sections 320. Namely, the transmission gear sections 320 may be disposed between the pair of ring gear sections 310 and be meshed with the ring gear sections 310.

Referring to FIGS. 14 to 18, the respective ring gear sections 310 may be installed between the planetary gears 131 and 231 and the connection wheels 122 and 222.

Each ring gear section 310 includes the ring gear inner part 311 and a ring gear outer part 315.

The ring gear inner parts 311 are disposed outside the planetary gear sections 130 and 230, and internal gear portions 312 may be formed on the inner circumferential surfaces of the ring gear inner parts 311 to be meshed with the planetary gear sections 130 and 230.

The internal gear portion 312 of the ring gear inner part 311 which is installed at one side (the left side in FIG. 16) is meshed with the planetary gear section 130 to be rotated in the clockwise or counterclockwise direction (in FIG. 16), and transmits power to the ring gear section 310, specifically, the ring gear outer part 315, which is disposed at the other side (the right side in FIG. 16), through the transmission gear sections 320.

The ring gear outer part 315 is coupled to the outer surface of the ring gear inner part 311, and an external gear portion 316 is formed on the outer circumferential surface of the ring gear outer part 315 to be meshed with the transmission gear section 320. The ring gear outer part 315 may be integrally formed with the ring gear inner part 311.

As the internal gear portion 312 of the ring gear inner part 311 which is installed at the one side (the left side in FIG. 16) is rotated while being meshed with the planetary gear section 130, the ring gear outer part 315 which is integrally formed with the ring gear inner part 311 is also rotated in the same direction.

Therefore, the rotational force of the ring gear outer part 315 at the one side is transmitted to the ring gear section 310, specifically, the ring gear outer part 315, which is disposed at the other side (the right side in FIG. 16), through the transmission gear sections 320.

The transmission gear sections 320 are rotated by being meshed with the external gear portions 316 which are formed on the ring gear sections 310, specifically, the ring gear outer parts 315, and transmit the rotational power of the ring gear section 310 disposed at the one side to the ring gear section 310 disposed at the other side.

The rotational power transmitted to the ring gear section 310 at the other side is transmitted to the carrier section 250 which is coupled to the planetary gears 231, via the ring gear inner part 311 and the planetary gears 231. As the planetary gears 231 rotate and revolve on the outer circumferential surface of the sun gear 211, the carrier section 250 which is coupled to the planetary gears 231 is rotated, and thus, the piston section 270 is moved toward the brake pad 20.

In the case where pressing loads for pressing the brake pad 20 are non-uniformly applied to the pair of pressing units 100 and 200, specifically, the pair of piston sections 170 and 270, the load transmission unit 300 may transmit a pressing load of the piston section 170 at the one side to the piston section 270 at the other side such that the pair of piston sections 170 and 270 may be brought into contact with the brake pad 20 with uniform pressing loads.

Of course, conversely, a pressing load of the piston section 270 at the other side may be transmitted to the piston section 170 at the one side.

Referring to FIGS. 15 to 18, in the present embodiment, the transmission gear sections 320 are formed in the shapes of spur gears, and are rotated by being meshed with the external gear portions 316 formed on the outer circumferential surfaces of the ring gear outer parts 315.

However, in addition to the shapes of spur gears, the shapes of the transmission gear sections 320 may be replaced with various shapes such as the shapes of bevel gears and the shapes of helical gears whose gear teeth are formed to be inclined at a predetermined angle with respect to the rotation axes of the transmission gear sections 320.

Moreover, while it is illustrated that the transmission gear sections 320 have the shapes of gears, it is to be noted that the disclosure is not limited thereto, and various modifications are possible like a configuration in which the transmission gear sections 320 are connected in the shapes of belts to the pair of ring gear sections 310 and transmit power of the pressing unit 100 at the one side to the pressing unit 200 at the other side.

The number of the ring gear sections 310 of the load transmission unit 300 may be changed. Therefore, the number of the ring gear sections 310 is not limited to two as in the present embodiment, and may be variously changed to one or three or more depending on a distance between the pair of pressing units 100 and 200.

The operation principle of the parking brake apparatus 1 for a vehicle constructed as mentioned above will be described below.

In the parking brake apparatus 1 for a vehicle in accordance with the embodiment of the present disclosure, the plurality of pressing units 100 and 200 press the brake pad 20 to move the brake pad 20 toward the disc, and a braking force is generated due to the contact friction between the brake pad 20 and the disc.

In the embodiment of the present disclosure, two pressing units 100 and 200 are provided. However, it is to be noted that the present disclosure is not limited thereto, and various modifications such as three or more pressing units are possible.

When the parking brake apparatus 1 for a vehicle is operated, that is, when a braking load is applied, the pressing units 100 and 200 receive power from the driving unit, and are linearly reciprocated relative to the brake pad 20.

In detail, when power is generated in the motor section 30 by receiving electric power from the outside, the power transmission section 40 which is connected with the motor section 30 is rotated by receiving power from the motor section 30. The power transmission section 40 simultaneously transmits rotational power to the pair of pressing units 100 and 200.

In detail, the power generated from the motor body 31 is transmitted to the first transmission gear 41 which is meshed with the driving gear 32. Since the second transmission gear 42 is connected to the first transmission gear 41, the second transmission gear 42 is rotated in the same direction as the first transmission gear 41.

The rotational force of the second transmission gear 42 is transmitted to the large diameter transmission gear 51. Since the small diameter transmission gear 52 is connected to the large diameter transmission gear 51, the small diameter transmission gear 52 is rotated in the same direction as the large diameter transmission gear 51.

The small diameter transmission gear 52 is constituted by a helical gear, and the connection gear sections 120 and 220 meshed with the small diameter transmission gear 52 are also constituted by helical gears.

While the connection gear sections 120 and 220 are rotated as the small diameter transmission gear 52 is rotated, an upward axial force is generated in the small diameter transmission gear 52, and as a result, the small diameter transmission gear 52 is moved in a direction facing away from the transmission gear sections 320 (see FIG. 13).

In the case where the parking brake apparatus 1 for a vehicle is in an inoperative state, that is, in the case where a braking load is not applied, the transmission gear section restraint unit 90 is meshed with the transmission gear sections 320. Thus, the rotation of the transmission gear sections 320 is restrained by the transmission gear section restraint unit 90.

Since the small diameter transmission gear 52 and the connection gear sections 120 and 220 are constituted by helical gears and the connection gear sections 120 and 220 are fixed in their positions, the upward axial force generated in the small diameter transmission gear 52, that is, the upward axial force generated between the small diameter transmission gear 52 and the connection gear sections 120 and 220, causes the small diameter transmission gear 52 to be moved relative to the connection gear sections 120 and 220.

If power is provided by the operation of the driving unit and the power transmission section 40, the meshing of the transmission gear section restraint unit 90 and the transmission gear sections 320 is released by the upward axial force generated in the small diameter transmission gear 52, and the transmission gear sections 320 are in a rotatable state.

Since the first transmission gear 41 and the second transmission gear 42 and then the large diameter transmission gear 51 and the small diameter transmission gear 52 are sequentially rotated by the driving of the motor section 30, the connection gear sections 120 and 220 meshed with the small diameter transmission gear 52 are rotated.

According to the rotation of the connection gear sections 120 and 220, the sun gear sections 110 and 210 are also rotated in an interlocked manner, and the planetary gears 131 and 231 which are meshed with the sun gears 111 and 211 perform rotating motion and at the same time perform revolving motion around the sun gears 111 and 211.

As the planetary gears 131 and 231 perform the revolving motion, the carrier sections 150 and 250 which are coupled to the planetary gears 131 and 231 are rotated in the clockwise or counterclockwise direction. As the carrier sections 150 and 250 are rotated, the piston sections 170 and 270 which are coupled to the carrier sections 150 and 250 are moved toward the brake pad 20 and press the brake pad 20 by being brought into contact with the brake pad 20.

Due to various factors, the power provided from the driving unit may be transmitted more to any one of the pair of pressing units 100 and 200.

As illustrated in FIG. 17, when the parking brake apparatus 1 for a vehicle is driven, in the case where power is transmitted more to the pressing unit 100 disposed at the one side (the left side in FIG. 17) than the pressing unit 200 disposed at the other side (the right side in FIG. 17), the piston section 170 at the one side may be brought into contact with the brake pad 20 earlier than the piston section 270 at the other side.

If the piston section 170 at the one side is in a state in which it is already brought into contact with the brake pad 20 and the piston section 270 at the other side is in a state in which it is not yet brought into contact with the brake pad 20, the planetary gear section 130 of the pressing unit 100 at the one side performs only rotating motion. That is to say, the planetary gear section 130 does not perform revolving motion.

Since the power generated by the operation of the driving unit is continuously transmitted to the sun gear 111, the sun gear 111 is continuously rotated. At this time, since the piston section 170 is in the state in which it is already brought into contact with the brake pad 20, the plurality of planetary gears 131 which are meshed with the sun gear 111 do not perform revolving operation but perform only rotating motion.

Since the pressing unit 100, specifically, the piston section 170, which is disposed at the left side in FIG. 17 can no longer be moved toward the brake pad 20, due to a reaction force to this, the planetary gears 131 perform only rotating motion, and the ring gear inner part 311 which is formed with the internal gear portion 312 to be meshed with the planetary gears 131 is rotated in the clockwise or counterclockwise direction.

The reaction force, which is generated in the pressing unit 100 at the one side (the left side in FIG. 17) through the ring gear outer part 315 which is integrally coupled with the ring gear inner part 311, is transmitted to the pressing unit 200 at the other side (the right side in FIG. 17) through the transmission gear sections 320.

When the parking brake apparatus 1 for a vehicle is operated, that is, when a braking load is applied, the meshing of the transmission gear section restraint unit 90 and the transmission gear sections 320 is released, and thus, the transmission gear sections 320 are in a rotatable state. Therefore, a reaction force generated in the pressing unit 100 at one side may be transmitted to the pressing unit 200 at the other side through the transmission gear sections 320.

The power provided to the pressing unit 100 at the one side is transmitted to the piston section 270 at the other side through the external gear portion 316 at the other side, the internal gear portion 312 of the ring gear inner part 311, the planetary gear section 230 and the carrier section 250 coupled with the planetary gear section 230.

Accordingly, the power provided from the driving unit is provided to the piston section 270 at the other side which is not yet brought into contact with the brake pad 20, and the linear movement of the piston section 170 at the one side which is already brought into contact with the brake pad 20 is stopped until the piston section 270 at the other side is brought into contact with the brake pad 20.

Thereafter, when both the piston sections 170 and 270 at the one side and the other side are brought into contact with the brake pad 20, the power of the driving unit is provided to the respective piston sections 170 and 270 at the one side and the other side, and the piston sections 170 and 270 at the one side and the other side simultaneously press the brake pad 20 with uniform loads.

Referring to FIGS. 15 to 18, in the case where a pressing load is concentrated on the pressing unit 100 at the one side between the pair of pressing units 100 and 200, the load transmission unit 300 in accordance with the embodiment of the present disclosure may transmit the pressing load to the pressing unit 200 at the other side such that the pair of pressing units 100 and 200 may press the brake pad 20 toward the disc with uniform pressing loads.

Likewise, in the case where a pressing load is more concentrated on the pressing unit 200 at the other side between the pair of pressing units 100 and 200, the load transmission unit 300 may transmit the pressing load to the pressing unit 100 at the one side such that the pair of pressing units 100 and 200 may press the brake pad 20 toward the disc with uniform pressing loads.

Referring to FIG. 14, the ring gear inner parts 311 may project more toward the sun gear sections 110 and 210 (the left side in FIG. 14) than the ring gear outer parts 315, and may be inserted into the connecting insertion parts 123 and 223 of the connection gear sections 120 and 220.

Due to this fact, it is possible to prevent the ring gear sections 310 from being released from the connection gear sections 120 and 220 or the sun gear sections 110 and 220 when receiving rotational power from the driving unit.

As the carrier sections 150 and 250 are spline-coupled to the piston sections 170 and 270, the rotational power of the carrier sections 150 and 250 may be transmitted to the piston sections 170 and 270, specifically, the piston connection parts 173 and 273.

The piston connection parts 173 and 273 are coupled to the piston shafts 172 and 272 which are coupled to the piston bodies 171 and 271, and, by the rotational power received through the carrier sections 150 and 250, cause the piston bodies 171 and 271 to be linearly moved toward the brake pad 20.

In the case where the braking operation of the parking brake apparatus 1 for a vehicle is released, that is, in the case where the braking load is removed, a downward axial force is generated in the small diameter transmission gear 52, and the small diameter transmission gear 52 is moved toward the transmission gear sections 320 (see FIG. 12).

As a result, the transmission gear section restraint unit 90 and the transmission gear sections 320 are meshed with each other, and the rotation of the transmission gear sections 320 is restrained. Accordingly, a piston load balancing operation performed through the rotation of the transmission gear sections 320 is blocked.

According to the present embodiment, in a process in which the braking operation of the parking brake apparatus 1 for a vehicle is released, the respective piston sections 170 and 270 are separated from the brake pad 20 without a separate load balancing operation, and thus, a braking release operation may be performed in real time, whereby it is possible to improve the braking release performance.

Although the disclosure has been disclosed with reference to the embodiments illustrated in the drawings, the embodiments are only for illustrative purposes, and those skilled in the art will appreciate that various modifications and other equivalent embodiments are possible, without departing from the scope and spirit of the disclosure as defined in the accompanying claims. Thus, the true technical scope of the disclosure should be defined by the following claims.

What is claimed is:

1. A parking brake apparatus for a vehicle, comprising:
   a motor section configured to generate power;
   a power transmission section configured to rotate by driving of the motor section;
   a pair of pressing units configured to receive power from the power transmission section, and press a brake pad;
   a load transmission unit installed between the pair of pressing units, connected to each of the pair of pressing units, and configured to transmit a pressing load of any one of the pair of pressing units to the other pressing unit; and
   a transmission gear section restraint unit configured to selectively restrain driving of the load transmission unit in conjunction with rotation of the power transmission section,
   wherein:
   each of the pair of pressing units comprises:
      a sun gear section configured to rotate by receiving power from the power transmission section;
      a planetary gear section configured to rotate by being meshed with the sun gear section;
      a carrier section coupled to the planetary gear section; and
      a piston section connected to the carrier section, and configured to press the brake pad by being moved toward the brake pad through receiving rotational power from the planetary gear section;
   the power transmission section comprises a small diameter transmission gear which is rotated by driving of the motor section, transmits power to the sun gear section through a connection gear section, and is coupled to the transmission gear section restraint unit;
   the small diameter transmission gear and the connection gear section are formed in the shapes of helical gears; and the small diameter transmission gear moves the transmission gear section restraint unit by being moved relative to the connection gear section when being rotated.

2. The parking brake apparatus of claim 1, wherein the connection gear section comprises:

a connection gear body coupled to the sun gear section;

a connection wheel formed on an outer circumferential surface of the connection gear body, meshed with the small diameter transmission gear, and formed in the shape of a helical gear; and a connecting insertion part formed in a space inside a wall on which the connection wheel is formed, and having a ring gear section inserted therein.

3. The parking brake apparatus of claim 2, wherein the load transmission unit comprises:

a pair of ring gear sections; and one or more transmission gear sections disposed between the pair of ring gear sections, and meshed with the ring gear sections.

4. The parking brake apparatus of claim 3, wherein each of the pair of ring gear sections comprises:

a ring gear inner part formed with an internal gear portion on an inner circumferential surface thereof to be meshed with the planetary gear section; and a ring gear outer part coupled to an outer surface of the ring gear inner part, and formed with an external gear portion on an outer circumferential surface thereof to be meshed with the transmission gear section.

5. The parking brake apparatus of claim 3, wherein the transmission gear section restraint unit comprises:

a restraint body disposed to face the transmission gear sections, and having a mounting hole part into which the small diameter transmission gear is mounted; and rotation-preventing engagement parts disposed on the restraint body, and formed to be meshed with transmission gear engagement parts of the transmission gear sections.

6. The parking brake apparatus of claim 5, wherein the rotation-preventing engagement parts and the transmission gear engagement parts are formed in serrated shapes to be meshed with each other.

7. The parking brake apparatus of claim 6, wherein rotation of the transmission gear sections is restrained when the rotation-preventing engagement parts and the transmission gear engagement parts are meshed, and is allowed when the rotation-preventing engagement parts and the transmission gear engagement parts are unmeshed.

8. The parking brake apparatus of claim 5, further comprising a restraint maintenance unit configured to provide a pressing force to the transmission gear section restraint unit to maintain a state in which the transmission gear section restraint unit is meshed with the transmission gear sections.

9. The parking brake apparatus of claim 5, wherein the power transmission section further comprises:

a first transmission gear meshed with the motor section, and configured to receive power from the motor section;

a second transmission gear connected to the first transmission gear, having a diameter less than the first transmission gear, and rotated in the same direction as the first transmission gear; and a large diameter transmission gear meshed with the second transmission gear, wherein the small diameter transmission gear is connected to the large diameter transmission gear, has a diameter less than the large diameter transmission gear, and is rotated in the same direction as the large diameter transmission gear.

\* \* \* \* \*